(12) United States Patent
Matsumoto

(10) Patent No.: US 9,097,887 B2
(45) Date of Patent: Aug. 4, 2015

(54) TELESCOPE OPTICAL SYSTEM AND OPTICAL DEVICE PROVIDED THEREWITH

(75) Inventor: Miho Matsumoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 242 days.

(21) Appl. No.: 13/699,657

(22) PCT Filed: May 10, 2011

(86) PCT No.: PCT/JP2011/002595
§ 371 (c)(1),
(2), (4) Date: Nov. 23, 2012

(87) PCT Pub. No.: WO2011/148579
PCT Pub. Date: Dec. 1, 2011

(65) Prior Publication Data
US 2013/0063812 A1  Mar. 14, 2013

(30) Foreign Application Priority Data
May 24, 2010  (JP) .................................. 2010-117992

(51) Int. Cl.
*G02B 23/00*   (2006.01)
*G02B 27/00*   (2006.01)
(Continued)

(52) U.S. Cl.
CPC .......... *G02B 27/0037* (2013.01); *G02B 5/1895* (2013.01); *G02B 23/00* (2013.01); *G02B 27/0056* (2013.01); *G02B 27/4211* (2013.01)

(58) Field of Classification Search
CPC .. G02B 27/0037; G02B 5/1895; G02B 23/00; G02B 27/0056; G02B 27/4211
USPC ........................................................ 359/399
See application file for complete search history.

(56) References Cited

U.S. PATENT DOCUMENTS

| 5,446,588 A * | 8/1995 | Missig et al. ................. 359/565 |
| 5,493,441 A * | 2/1996 | Chipper ........................ 359/354 |

(Continued)

FOREIGN PATENT DOCUMENTS

| EP | 1 830 204 A1 | 9/2007 |
| EP | 1 830 205 A1 | 9/2007 |

(Continued)

OTHER PUBLICATIONS

Thomas W. Stone, "Hybrid diffractive-refractive telescope", SPIE vol. 1212 Practical Holography IV (1990), pp. 257-266.*

*Primary Examiner* — Frank Font
(74) *Attorney, Agent, or Firm* — Miles & Stockbridge P.C.

(57) ABSTRACT

A telescope optical system having an objective lens system and an eyepiece lens system; wherein: the objective lens system includes a multi-layer-type diffractive optical element (PFo), and cemented lenses (So1) provided with a lens having positive refractive power and a lens having negative refractive power; the eyepiece lens system includes a multi-layer-type diffractive optical element (PFe), and cemented lenses (Se1) provided with a lens having negative refractive power and a lens having positive refractive power; and the condition represented by: $2 \leq |(Po/FNO)/\{Pe/(\theta \times m)\}| \leq 15$ is satisfied, where Ko represents the power of the objective lens system, Kodoe represents the power of the diffractive optical element (PFo) of the objective lens system, and Po is defined as Po=Kodoe/Ko; Ke represents the power of the eyepiece lens system, Kedoe represents the power of the diffractive optical element (PFe) of the eyepiece lens system, and Pe is defined as Pe=Kedoe/Ke; and FNO represents the F-number of the objective lens system, $\theta$ represents the real field of view of the telescope optical system, and m represents the magnification of the telescope optical system.

21 Claims, 17 Drawing Sheets (EXAMPLE 1)

(51) Int. Cl.
*G02B 5/18* (2006.01)
*G02B 27/42* (2006.01)

(56) References Cited

U.S. PATENT DOCUMENTS

| | | | |
|---|---|---|---|
| 6,122,104 A * | 9/2000 | Nakai | 359/576 |
| 6,130,785 A * | 10/2000 | Abe et al. | 359/646 |
| 6,144,502 A | 11/2000 | Hayakawa et al. | |
| 6,219,185 B1 * | 4/2001 | Hyde | 359/565 |
| 6,362,918 B1 * | 3/2002 | Netzer | 359/399 |
| 2002/0039233 A1 * | 4/2002 | Sugiyama et al. | 359/569 |
| 2005/0219702 A1 * | 10/2005 | Nakai | 359/573 |
| 2008/0231956 A1 | 9/2008 | Yasui | |
| 2008/0239493 A1 * | 10/2008 | Ushigome | 359/576 |
| 2009/0067052 A1 * | 3/2009 | Seesselberg | 359/571 |
| 2009/0303600 A1 * | 12/2009 | Matsumoto et al. | 359/576 |
| 2010/0254005 A1 * | 10/2010 | Matsumoto | 359/558 |

FOREIGN PATENT DOCUMENTS

| | | |
|---|---|---|
| JP | 10-311956 A | 11/1998 |
| JP | 11-258525 A | 9/1999 |
| JP | 2004-126395 A | 4/2004 |
| JP | 2008-242391 A | 10/2008 |
| WO | WO 2009/081831 A1 | 7/2009 |

* cited by examiner (EXAMPLE 1)

(EXAMPLE 2)

(EXAMPLE 3)

LATERAL CHROMATIC ABERRATION (EXAMPLE 5)

FIG.15
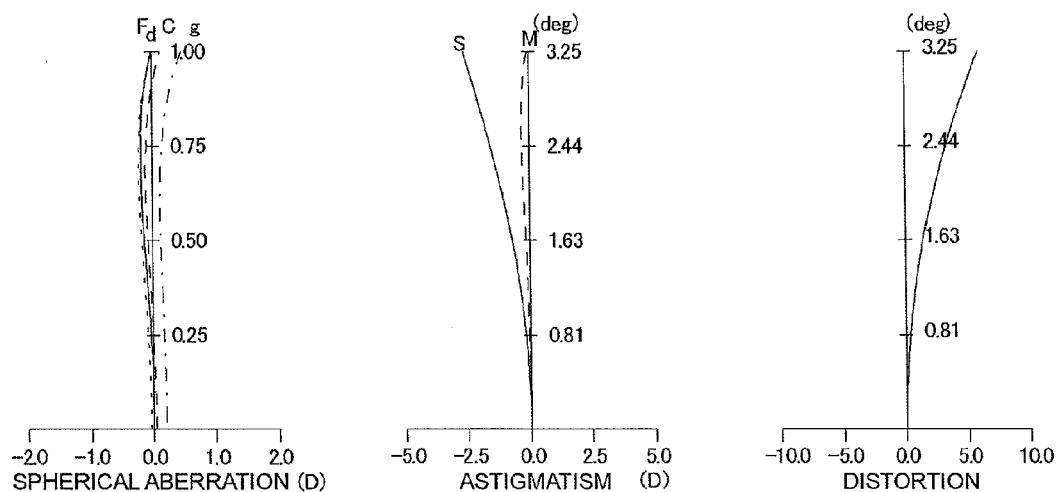
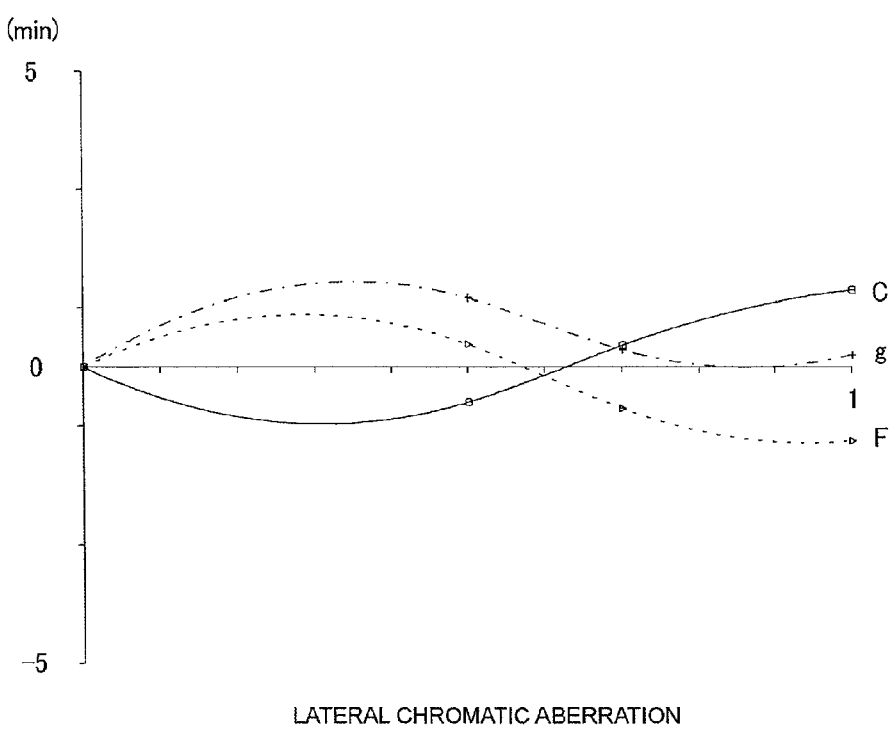
LATERAL CHROMATIC ABERRATION

TELESCOPE OPTICAL SYSTEM AND OPTICAL DEVICE PROVIDED THEREWITH

TECHNICAL FIELD

The present invention relates to a telescope optical system used for binoculars, telescopes, and similar devices; and an optical device comprising the optical system.

TECHNICAL BACKGROUND

A normal telescope optical system comprises, in order from an object, an objective lens system and an eyepiece lens system. An Image of a distant object is formed by the objective lens system on the focal plane thereof, and the formed image is magnified by the eyepiece lens system and viewed.

The objective lens system generally includes a cemented lens comprising cementing of a lens having positive refractive power and a lens having negative refractive power. The cemented lens generates and cancels out positive and negative aberrations, thereby correcting axial chromatic aberration. The eyepiece lens system generally comprises two or more lenses, and corrects lateral chromatic aberration through setting an appropriate spacing between the lenses. Alternatively, in an instance in which the eyepiece lens system includes a cemented lens comprising cementing of a lens having negative refractive power and a lens having positive refractive power, the lateral chromatic aberration is balanced using the cemented lens or by setting an appropriate lens spacing between the cemented lens and other lenses.

Meanwhile, in recent years, diffractive optical elements having a configuration that is drastically different from conventional optical lenses are used in a variety of optical systems in order to, e.g., reduce various aberrations. There have been proposed objective lens systems in which a diffractive optical element is used in order to reduce the occurrence of various aberrations, particularly axial chromatic aberration (e.g., see Patent Document 1). There have also been proposed eyepiece lens systems in which a diffractive optical element is used in order to reduce the occurrence of various aberrations, particularly lateral chromatic aberration (e.g., see Patent Document 2).

PRIOR ARTS LIST

Patent Document

Patent Document 1: Japanese Laid-open Patent Publication No. 2004-126395(A)

Patent Document 2: International Patent Publication No. WO2009/081831(A1)

SUMMARY OF THE INVENTION

Problems to be Solved by the Invention

However, in a conventional telescope optical system in which a diffractive optical element is used in each of the objective lens system and the eyepiece lens system as described above, the axial chromatic aberration and the lateral chromatic aberration are not sufficiently corrected in a balanced manner in all of the systems.

The present invention was conceived in view of this problem, and a purpose of the present invention is to provide a telescope optical system in which various aberrations such as axial chromatic aberration and lateral chromatic aberration are corrected in a satisfactory manner, and an optical device comprising the telescope optical system.

Means to Solve the Problems

According to a first aspect exemplifying the present invention, there is provided a telescope optical system having an objective lens system and an eyepiece lens system; wherein the objective lens system includes a diffractive optical element, and at least one set of cemented lenses provided with a lens having positive refractive power and a lens having negative refractive power; the eyepiece lens system includes a diffractive optical element, and at least one set of cemented lenses provided with a lens having negative refractive power and a lens having positive refractive power; the diffractive optical element has a first diffractive optical element having a first diffractive optical surface, and a second diffractive optical element having a second diffractive optical surface, and the first diffractive optical element and the second diffractive optical element are arranged so that the first diffractive optical surface and the second diffractive optical surface face each other; and the condition represented by the following expression is satisfied: $2 \leq |(Po/FNO)/\{Pe/(\theta \times m)\}| \leq 15$ where Ko represents the power of the objective lens system, Kodoe represents the power of the diffractive optical element of the objective lens system, and Po is defined as Po=Kodoe/Ko; Ke represents the power of the eyepiece lens system, Kedoe represents the power of the diffractive optical element of the eyepiece lens system, and Pe is defined as Pe=Kedoe/Ke; and FNO represents the F-number of the objective lens system, $\theta$ represents the real field of view of the telescope optical system, and m represents the magnification of the telescope optical system.

In the present specification, the expression "the first diffractive optical surface and the second diffractive optical surface are arranged so as to face each other" corresponds to a broad concept including a state in which "the first diffractive optical surface and the second diffractive optical surface are arranged so as to be in contact with each other" (so-called close multi-layer-type) and a state in which "the first diffractive optical surface and the second diffractive optical surface are arranged so as to face each other with a spacing being provided therebetween" (so-called separated multi-layer-type).

According to a second aspect exemplifying the present invention, there is provided an optical device (e.g., binoculars) comprising the telescope optical system according to the first aspect.

Advantageous Effects of the Invention

The present invention makes it possible to provide a telescope optical system in which various aberrations such as axial chromatic aberration and lateral chromatic aberration are corrected in a satisfactory manner, and an optical device comprising the telescope optical system.

BRIEF DESCRIPTION OF THE DRAWINGS

FIG. 15 depicts graphs showing various aberrations of the telescope optical system according to example 5;

DESCRIPTION OF THE EMBODIMENTS

The present embodiment will now be described. The telescope optical system according to the present embodiment has an objective lens system and an eyepiece lens system. The objective lens system has at least one diffractive optical element, and at least one set of cemented lenses comprising cementing of a lens having positive refractive power and a lens having negative refractive power (the sequence in which the lenses are arranged is inconsequential). The eyepiece lens system has at least one diffractive optical element, and at least one set of cemented lenses comprising cementing of a lens having negative refractive power and a lens having positive refractive power (the sequence in which the lenses are arranged is inconsequential). The diffractive optical element used in the objective lens system and the eyepiece lens system may be used as a unitary or incorporated into the cemented lens and used, as described below.

Figure 1:
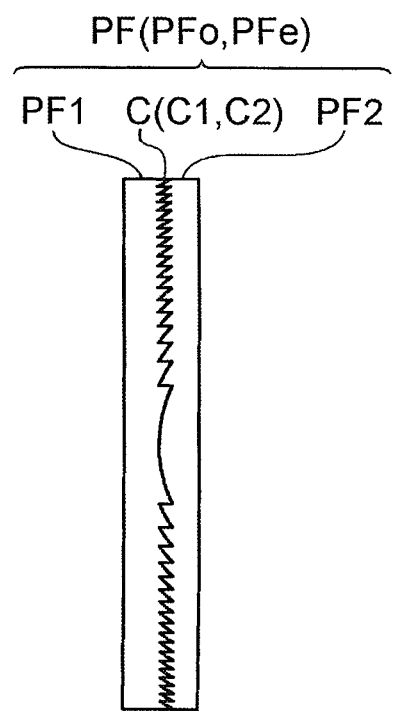
FIG. 1 is a schematic diagram illustrating a diffractive optical element according to the present embodiment.

The diffractive optical element used in the objective lens system and the eyepiece lens system has, as shown in FIG. 1, a first diffractive optical element PF1 having a first diffractive optical surface, and a second diffractive optical element PF2 having a second diffractive optical surface, made from different optical materials. The first diffractive optical element PF1 and the second diffractive optical element PF2 are multi-layer diffractive optical elements PF in which the first diffractive optical surface and the second diffractive optical surface are arranged so as to face each other. In the present embodiment, there is used a so-called contact multi-layer diffractive optical element in which, as shown in FIG. 1, a first diffractive optical surface C1 and a second diffractive optical surface C2 are arranged so as to be cemented in intimate contact at a diffractive optical surface C.

The telescope optical system of the present embodiment satisfies the following conditional expression (1) when Ko represents the power of the objective lens system, Kodoe represents the power of the diffractive optical element of the objective lens system, Po is defined as Po=Kodoe/Ko, Ke represents the power of the eyepiece lens system, Kedoe represents the power of the diffractive optical element of the eyepiece lens system, Pe is defined as Pe=Kedoe/Ke, FNO represents the F-number of the objective lens system, θ represents the real field of view of the telescope optical system, and m represents the magnification of the telescope optical system.

$$2 \leq |(Po/FNO)/\{Pe/(\theta \times m)\}| \leq 15 \quad (1)$$

The above conditional expression (1) is a condition for correcting various aberrations satisfactorily using an objective lens system and an eyepiece lens system in which a multi-layer diffractive optical element is incorporated, and is a condition for correcting axial chromatic aberration and lateral chromatic aberration in particular in a balanced manner. It would be difficult to correct the various aberrations such as axial chromatic aberration and lateral chromatic aberration satisfactorily over the upper limit or below the lower limit of the conditional expression (1). When the lower limit of the conditional expression (1) is set to 3, it is possible to correct the various aberrations such as axial chromatic aberration and lateral chromatic aberration in an even more satisfactory manner. Similarly, when the upper limit of the conditional expression (1) is set to 14, it is possible to correct the various aberrations such as axial chromatic aberration and lateral chromatic aberration in an even more satisfactory manner. When this upper limit is set to 10, it is possible to correct the various aberrations in an even more reliable manner.

In the telescope optical system according to the present embodiment, when Ko represents the power of the objective lens system, Kodoe represents the power of the diffractive optical element of the objective lens system, and Po is defined as Po=Kodoe/Ko, it is preferable that the following conditional expression (2) is satisfied.

$$0.007 \leq |Po| \leq 0.018 \quad (2)$$

The above conditional expression (2) stipulates the absolute value of the ratio of the power of the diffractive optical element of the objective lens system relative to the power of the objective lens system in a telescope optical system in which a diffractive optical element is used in both the objective lens system and the eyepiece lens system. Satisfying the conditional expression (2) makes it possible to satisfactorily correct the various aberrations such as axial chromatic aberration and lateral chromatic aberration. Over the upper limit of the conditional expression (2), the axial chromatic aberration of the F-line and the g-line, using the d-line as reference, will be deficient in achromatization. Under the lower limit of the conditional expression (2), the axial chromatic aberration of the F-line and the g-line, using the d-line as reference, will be such that there will be excessive achromatization. Setting the lower limit of the conditional expression (2) to 0.01 makes it possible to further reliably prevent the axial chromatic aberration of the F-line and the g-line, using the d-line as reference, from reaching excessive achromatization, and to correct the various aberrations even more satisfactorily. Similarly, setting the upper limit of the conditional expression (2) to 0.017 makes it possible to further reliably prevent the axial chromatic aberration of the F-line and the g-line, using the d-line as reference, from being deficient in achromatization, and to correct the various aberrations even more satisfactorily. Setting the upper limit to 0.015 makes it possible to further reliably prevent the axial chromatic aberration from being deficient in achromatization, and to correct the various aberrations in a more reliable manner.

In the telescope optical system according to the present embodiment, it is preferable that the cemented lens forming the objective lens system have positive refractive power overall. This configuration makes it possible to correct the axial chromatic Aberration in a satisfactory manner.

In the telescope optical system according to the present embodiment, it is preferable that the cemented lens forming the objective lens system have, in order from the object, a lens having positive refractive power and a lens having negative refractive power arranged therein. This configuration makes it possible to correct the axial chromatic aberration in a satisfactory manner.

In the telescope optical system according to the present embodiment, a similar effect as above can be obtained when the cemented lens forming the objective lens system has, in order from the object, a lens having negative refractive power and a lens having positive refractive power arranged therein in an opposite sequence to that above. Specifically, it is possible to correct the axial chromatic aberration in a satisfactory manner.

In the telescope optical system according to the present embodiment, it is preferable that the diffractive optical element be cemented to an eye-point-side surface of the lens having negative refractive power and forming the cemented lens of the objective lens system. This configuration makes it possible to correct the axial chromatic aberration in a satisfactory manner.

In the telescope optical system according to the present embodiment, it is preferable that the diffractive optical element be arranged between the lens having positive refractive power and the lens having negative refractive power (the sequence in which the lenses are arranged is inconsequential), the lenses forming the cemented lens of the objective lens system, and that the lenses and the diffractive optical element all be cemented. This configuration makes it possible to correct the axial chromatic aberration in a satisfactory manner.

In the telescope optical system according to the present embodiment, it is preferable that the objective lens system has a parallel flat plate on the object side of the cemented lens forming the lens system, and that the diffractive optical element is cemented to the object-side surface or the eye-point-side surface of the parallel flat plate. This configuration makes it possible to correct the axial chromatic aberration in a satisfactory manner.

In the telescope optical system according to the present embodiment, it is preferable for the objective lens system to have two parallel flat plates on the object side of the cemented lens forming the lens system, a diffractive optical element is arranged between the two parallel flat plates, and the diffractive optical element and the parallel flat plates are all cemented. This configuration makes it possible to correct the axial chromatic aberration in a satisfactory manner.

In the telescope optical system according to the present embodiment, it is preferable for the cemented lens forming the eyepiece lens system to have positive refractive power overall. This configuration makes it possible to correct the lateral chromatic aberration in a satisfactory manner.

In the telescope optical system according to the present embodiment, it is preferable for the cemented lens forming the eyepiece lens system to have, in order from the object, a lens having negative refractive power and a lens having positive refractive power arranged therein. This configuration makes it possible to correct the lateral chromatic aberration in a satisfactory manner and further expand the visual field.

In the telescope optical system according to the present embodiment, a similar effect as above can be obtained even when the cemented lens forming the eyepiece lens system has, in order from the object, a lens having positive refractive power and a lens having negative refractive power arranged therein in an opposite sequence to that above. Specifically, it is possible to correct the lateral chromatic aberration in a satisfactory manner and further expand the visual field.

In the telescope optical system according to the present embodiment, it is preferable that the diffractive optical element be arranged between the lens having negative refractive power, and the lens having positive refractive power (the sequence in which the lenses are arranged is inconsequential), the lenses forming the cemented lens of the eyepiece lens system, and that the lenses and the diffractive optical element all be cemented. This configuration makes it possible to correct the lateral chromatic aberration in a satisfactory manner.

In the telescope optical system according to the present embodiment, it is preferable that the diffractive optical element be cemented to the object-side surface of the lens having negative refractive power and forming the cemented lens of the eyepiece lens system. This configuration makes it possible to correct the lateral chromatic aberration in a satisfactory manner.

In the telescope optical system according to the present embodiment, it is preferable for the eyepiece lens system to have at least a single lens having positive refractive power. This configuration makes it possible to correct the lateral chromatic aberration in a satisfactory manner and further expand the visual field.

The single lens having positive refractive power is preferably arranged on the eye-point-side of the cemented lens forming the eyepiece lens system. This configuration makes it possible to correct the lateral chromatic aberration in a satisfactory manner and further expand the visual field.

In the telescope optical system according to the present embodiment, it is preferable that the diffractive optical element be cemented to the eye-point-side surface of the single lens having positive refractive power and forming the eyepiece lens system. This configuration makes it possible to correct the lateral chromatic aberration in a satisfactory manner. In the telescope optical system according to the present embodiment, a similar effect as above can be obtained even when the diffractive optical element is cemented to the object-side surface of the single lens having positive refractive power and forming the eyepiece lens system, in reversal of the above sequence. Specifically, this configuration also makes it possible to correct the lateral chromatic aberration in a satisfactory manner.

In the telescope optical system according to the present embodiment, it is preferable for the eyepiece lens system to have, further towards the object side than the position of the image created by the objective lens system, a lens having negative refractive power. The lens having negative refractive power is at least one of a lens having negative refractive power forming the cemented lens of the eyepiece lens system, a single lens, or a cemented lens. This configuration makes it possible to correct the lateral chromatic aberration in a satisfactory manner and further expand the visual field.

The diffractive optical element used in the telescope optical system according to the present embodiment comprises a diffractive optical surface (see FIG. 1) in which a fine grating structure comprising several to several hundred grooves or slits per millimeter is concentrically formed, and has a property of diffracting light incident on the diffractive optical surface towards a direction determined by the grating pitch (spacing between the diffraction grating grooves) and the wavelength of the incident light. Also, the diffractive optical element (diffractive optical surface) has a negative dispersion value, causes a large dispersion, and exhibits a high anomalous dispersion; and therefore has strong chromatic aberration correction performance. The Abbe number of optical glass is normally about 30 to 80. However, the Abbe number of the diffractive optical element has a negative value. In other words, the diffractive optical surface of the diffractive optical element has dispersion characteristics opposite to that of regular glass (refractive optical element), and has a property in which the refractive index decreases with decreasing light wavelength and the degree by which light is bent increases with increasing wavelength. Therefore, combining the diffractive optical element with a regular refractive optical element makes it possible to obtain a high achromatic effect. Therefore, by using a diffractive optical element, it becomes possible to correct chromatic-aberration in a satisfactory manner.

The diffractive optical element used in the telescope optical system according to the present embodiment has, as described above, a first diffractive optical element and a second diffractive optical element having a second diffractive optical surface, made from different optical materials. This diffractive optical element is a type of a so-called multilayer (or layered) diffractive optical element in which a first diffractive optical element and a second diffractive optical element are arranged so that the first diffractive optical surface and the second diffractive optical surface face each other. Therefore, the diffraction efficiency can be increased across a wide wavelength region encompassing from g-lines to C-lines. Accordingly, the telescope optical system according to the present embodiment can be used across a wide wavelength region. In an instance in which first-order diffraction light is used in a transmission-type diffractive optical element, the diffraction efficiency represents the ratio $\eta$ between the incidence intensity IO and the intensity I1 of first-order diffracted light $(=I1/I0 \times 100\ [\%])$.

The diffractive optical element used in the telescope optical system according to the present embodiment may be configured so that the first diffractive optical surface and the second diffractive optical surface arranged so as to face each other as described above are in contact with each other. Specifically, diffraction grating grooves formed on each of the two diffractive device elements may be placed in intimate contact with each other, and the diffractive optical element may be configured as a contact multi-layer diffractive optical element. A contact multi-layer diffractive optical element of such description is advantageous in that the manufacturing process can be made simpler compared to that for a so-called separated multi-layer diffractive optical element in which two diffractive device elements in which diffraction grating grooves are formed are arranged close to each other so that the diffraction grating grooves face each other, therefore improving mass production efficiency; and that the diffraction efficiency relative to the angle of incidence of light beams is better. Therefore, in a telescope optical system according to the present embodiment in which contact multi-layer diffractive optical elements of such description are used, manufacturing can be more readily performed and the diffraction efficiency is improved.

In the telescope optical system according to the present embodiment, a configuration is possible in which at least one of the first diffractive optical element and the second diffractive optical element forming the diffractive optical element is made from a UV-curing resin. This configuration makes it possible to increase the mass production performance and productivity of the diffractive optical element. Therefore, it is possible to increase the mass production performance and productivity of a telescope optical system according to the present embodiment in which the diffractive optical elements are used.

In detail, the diffractive optical elements can be manufactured using, as the material for the two diffractive device elements, normal glass or a heat-curing resin or a thermoplastic resin that can be injection-molded or the like for one of the diffractive device elements, and a UV-curing resin for the other diffractive device element. For example, in an instance in which glass is used as the material for one of the diffractive optical elements, it is possible to employ a manufacturing method in which a diffraction grating surface is formed by cutting and polishing, a UV-curing resin is subsequently dripped onto the diffraction grating surface, and the resin is irradiated with UV light and cured. In an instance in which a thermoplastic resin or a heat-curing resin is used as the material for one of the diffractive device elements, it is possible to employ a manufacturing method in which: injection molding is performed using a mold on which diffraction grating grooves are formed, or a similar process is performed, to form the diffractive optical surface; a UV-curing resin is dripped onto the diffraction grating surface; and the resin is irradiated with UV light and cured. Since it is possible to employ a manufacturing method of such description, and it becomes unnecessary to perform the tasks of creating individual diffraction grating surfaces for the two diffractive device elements and aligning the position of the diffraction grating surfaces, it is possible to increase the productivity and mass production performance of the diffractive optical element.

In the telescope optical system according to the present embodiment, a configuration is possible in which the first diffractive optical element and the second diffractive optical element forming the diffractive optical element are made from UV-curing resins having optical characteristics that differ from each other. This configuration makes it possible to increase the mass production performance and productivity of the diffractive optical element. Therefore, it is possible to increase the mass production performance and productivity of the telescope optical system according to the present embodiment in which this diffractive optical element is used.

In such an instance, first, one of the UV-curing resins dripped onto a substrate is embossed using a mold in which diffraction grating grooves are formed, UV light is beamed from the opposite side of the mold, and one of the diffractive device elements having a diffraction grating surface is formed. Next, the mold is removed, and the other UV-curing resin is dripped onto the diffraction grating surface cured by the UV irradiation. Next, the other UV-curing resin which has been dripped is irradiated with UV light, whereby the other UV-curing resin is cured and the other diffractive device element is formed. Employing a manufacturing method of such description makes it possible to form diffraction grating grooves using only one mold, obviates the need to perform a task of forming individual diffraction grating surfaces for the two diffractive device elements and aligning the position of the diffraction grating surfaces, and makes it possible to manufacture the diffractive optical element merely by performing the tasks of dripping and curing a UV-curing resin twice. Therefore, it is possible to further increase the mass production performance and productivity of the diffractive optical element.

In the telescope optical system according to the present embodiment, it is preferable that the following conditional expressions (3) through (6) be satisfied when: nd1, nF1, and nC1 represent the refractive index, in relation to the d-line (wavelength=587.562 nm), F-line (wavelength=486.133 nm), and C-line (wavelength=656.273 nm) respectively, of the diffractive device element, from among the two diffractive device elements forming the diffractive optical element, having a lower refractive index and a higher dispersion performance; and nd2, nF2, and nC2 represent the refractive index, in relation to the d-line, F-line, and C-line respectively, of the diffractive device element having a higher refractive index and a lower dispersion performance.

$$nd1 \leq 1.54 \tag{3}$$

$$0.0145 \leq nF1-nC1 \tag{4}$$

$$1.55 \leq nd2 \tag{5}$$

$$nF2-nC2 \leq 0.013 \tag{6}$$

The above conditional expressions (3) through (6) respectively stipulate the refractive index in relation to the d-line and the difference in refractive indices in relation to the F-line and the C-line (nF−nC) of the optical materials, i.e., the two different resins, used in the two different diffractive device elements forming the diffractive optical element of the telescope optical system. More specifically, the conditional expressions (3) through (6) stipulate resin optical characteristics to be satisfied after the resin has been cured in order to manufacture the diffractive optical element, with regards to the two different types of resin used in the diffractive optical element, i.e., a resin having optical characteristics in which the refractive index is relatively lower and the dispersion performance is higher, and a resin having optical characteristics in which the refractive index is higher and the dispersion performance is lower.

Satisfying the conditional expressions (3) through (6) of such description makes it possible to cement, in intimate contact, two different diffractive device elements and form a diffractive optical surface so as to obtain higher performance. As a result, it is possible to obtain a diffraction efficiency equal to or greater than 90% across a wide wavelength region from the g-line to the C-line. However, over the upper limit or under the lower limit of the conditional expressions (3) through (6), it becomes difficult to obtain a diffraction efficiency equal to or greater than 90% across a wide wavelength region, and it becomes difficult to maintain the advantage of a contact multi-layer diffractive optical element.

Methods for manufacturing the resin satisfying the above conditions and a close multi-layer diffractive optical element in which the resin is used are disclosed, e.g., in EP Patent Application Publication No. 1830204(A1) and EP Patent Application Publication No. 1830205(A1).

A description will now be given for equations for obtaining the diffraction efficiency. The diffraction efficiency is represented by the following equations (7) and (8), where m represents the order of diffraction, η represents the diffraction efficiency of $m^{th}$-order diffracted light, d1 represents the diffraction grating height of one of the diffractive device elements forming the diffraction grating surface (diffractive optical surface), d2 represents the diffraction grating height of the other diffractive device element forming the diffraction grating surface (diffractive optical surface), n1 represents the refractive index of the material of one of the diffractive device elements forming the diffraction grating surface (diffractive optical surface), n2 represents the refractive index of the material of the other diffractive device element forming the diffraction grating surface (diffractive optical surface), and λ represents the wavelength.

$$\eta m = \{\sin(a-m)\pi/(a-m)\pi\}^2 \tag{7}$$

$$a = \{(n1-1)d1-(n2-1)d2\}/\lambda \tag{8}$$

EXAMPLES

Examples according to the present embodiment will now be described with reference to the drawings. Tables 1 through 5, which are shown below, give data from the first through fifth examples.

In the tables, in "overall data", m represents the telescope magnification (power), EPD represents the entrance pupil diameter (mm), θ represents the real field of view (degrees), $f_o$ represents the focal length (mm) of the objective lens system forming the telescope optical system with respect to the d-line (wavelength 587.562 nm), $f_e$ represents the focal length (mm) of the eyepiece lens system forming the telescope optical system with respect to the d-line (587.562 nm), and n represents the number of lenses excluding the diffractive optical element forming the eyepiece lens system.

In "lens data", the surface number is the sequential number of the optical surface in order from the object; r represents the curvature radius (mm) of the optical surface; d represents the surface spacing (mm), which is the distance along the optical axis from an optical surface to the next optical surface (or the image surface); υd represents the Abbe number with respect to the d-line; and nd represents the refractive index with respect to the d-line. ∞ for the curvature radius represents a flat surface. The refractive index of air, 1.000000, is omitted.

In "diffraction surface data", the performance of the diffractive optical element used in each example is represented by the phase function Φ(h) described further below and the coefficient thereof. The phase function Φ(h) is represented by equation (a), where h represents the height from the optical axis, λ represents the wavelength, and C2 and C4 represent phase functions.

$$\Phi(h) = 2\pi/\lambda(C_2 h^2 + C_4 h^4) \tag{a}$$

The tables also show values corresponding to the above conditional expressions (1) through (6) as the "conditional expression correspondence value".

The curvature radius r, the surface spacing d, other lengths and similar measures set forth with regards to all data values are generally in millimeters unless specified. However, this is not provided by way of limitation, because regarding optical systems, proportionally expanding or shrinking the optical system results in a similar optical performance being obtained. Also, millimeter units are not used by way of limitation; another appropriate unit can also be used.

With regards to matters that are common to all examples, a diffractive optical element PFo arranged in the objective lens system is a contact multi-layer diffractive optical element for correcting the axial chromatic aberration in a satisfactory manner and obtaining a high diffraction efficiency across a wide wavelength region. Also the diffractive optical element PFe arranged in the eyepiece lens system is a contact multi-layer-type diffractive optical element for satisfactorily correcting lateral chromatic aberration in individual instances and obtaining a high diffraction efficiency across a wide wavelength region. The diffractive optical elements PFo, PFe are respectively formed by cementing, in intimate contact, diffractive optical device elements PFo1 and PFo2, and PFe1 and PFe2, made from two different UV-curing resins; and the resulting cementing surfaces constitute diffractive optical element surfaces Co, Ce, respectively.

Resins having the following refractive indices are used as the two different UV-curing resins forming the diffractive optical elements PFo, PFe. The resin refractive index represents the refractive index after the resin has cured. With regards to each of the resins, nC represents the refractive index in relation to the C-line (wavelength=656.273 nm), nd represents the refractive index in relation to the d-line (wavelength=587.562 nm), nF represents the refractive index in relation to the F-line (wavelength=486.133 nm), and ng represents the refractive index in relation to the g-line (wavelength=435.835 nm).

(Resin refractive indices)

|  | nC | nd | nF | ng |
|---|---|---|---|---|
| Low-refractive-index resin | 1.523300 | 1.527600 | 1.538500 | 1.547700 |
| High-refractive-index resin | 1.553700 | 1.556900 | 1.564800 | 1.571100 |

With regards to the diffractive optical elements PFo, PFe used in each of the examples, the diffraction grating height is 20.05 μm; and the first-order diffraction efficiency is 98% for the C-line, 100% for the d-line, 98% for the F-line, and 98% for the g-line.

Each of FIGS. 2, 5, 8, 11, and 14 shows the lens configuration in each of the examples. In these configuration diagrams, in order to avoid complication in the appearance of the diagrams, the numerals indicating the diffractive optical device elements PFo1, PFo2, and PFe1, PFe2; the numerals indicating the diffractive optical surfaces Co, Ce; and the shape of the diffraction grating grooves are not shown; and only the numerals indicating the diffractive optical elements PFo, PFe are shown. Also, although each of the examples is configured so that the light path is bent by an upright optical system, the configuration is shown in an opened manner in FIGS. 2, 5, 8, 11, and 14.

The description given to this point is common to all of the examples, and shall not be repeated in the following descriptions.

Example 1

Figure 2:
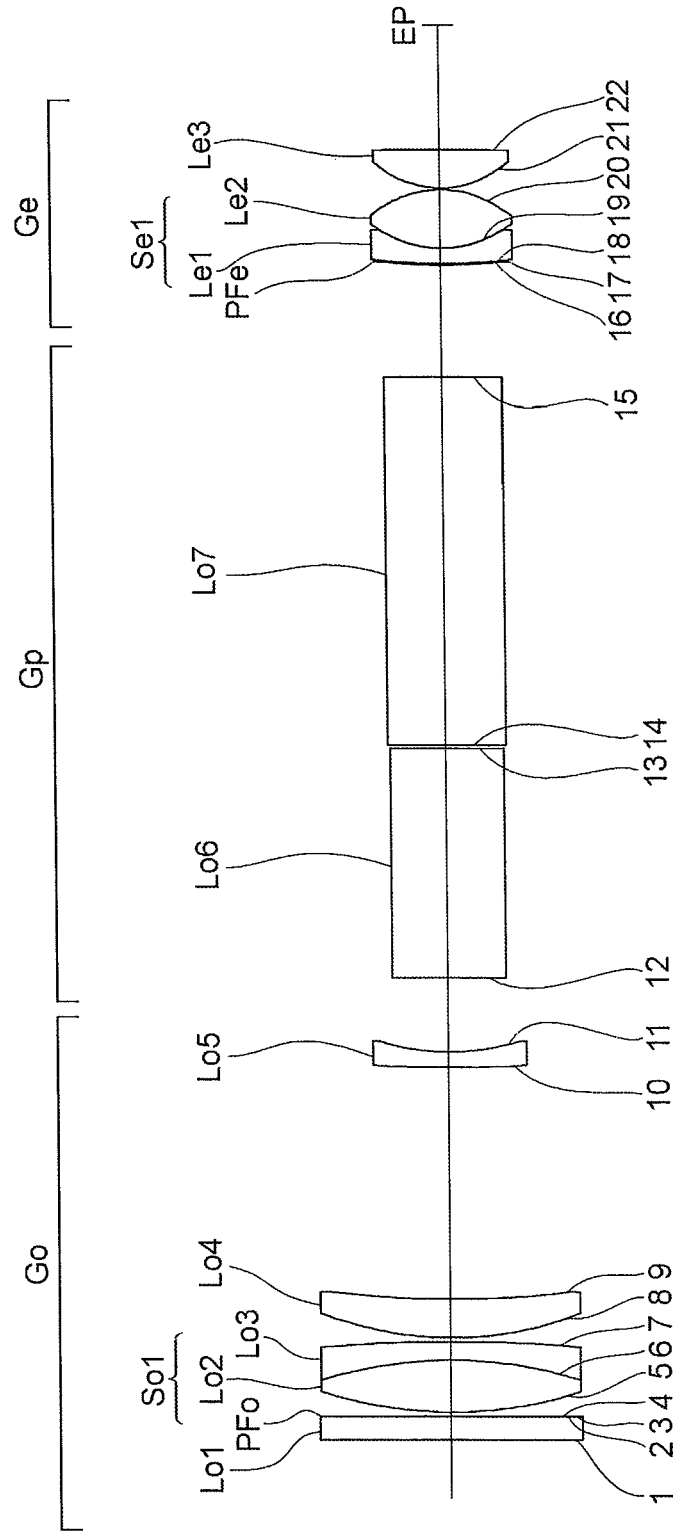
FIG. 2 represents the lens configuration of the telescope optical system according to example 1.

The telescope optical system according to example 1 will now be described with reference to FIGS. 2 through 4 and Table 1. As shown in FIG. 2, the telescope optical system according to example 1 has, arranged in sequence along the optical axis in order from the object, an objective lens system Go, an upright optical system Gp, and an eyepiece lens system Ge.

The objective lens system Go has, arranged along the optical axis in order from the object, a parallel flat plate Lo1, a cemented lens So1 comprising cementing of a lens Lo2 having positive refractive power and a lens Lo3 having negative refractive power, a lens Lo4 having positive refractive power, and a lens Lo5 having negative refractive power. The cemented lens So1 is a cemented lens having positive refractive power overall. The upright optical system Gp has prisms Lo6, Lo7.

The eyepiece lens system Ge has, arranged along the optical, axis in order from the object, a cemented lens Se1 comprising cementing of a lens Le1 having negative refractive power and a lens Le2 having positive refractive power, and a lens Le3 having positive refractive power. The cemented lens Se1 is a cemented lens having positive refractive power overall.

In the present example, the contact multi-layer-type diffractive optical element PFo described above is incorporated into the eye-point-side surface of the parallel flat plate Lo1 forming the objective lens system Go. The contact multi-layer-type diffractive optical element PFe described above is incorporated into the object-side surface of the lens Le1 having negative refractive power and forming the eyepiece lens system Ge.

The values for each item of data in example 1 are shown in Table 1. Surface numbers 1 to 22 in Table 1 correspond to surfaces 1 to 22 shown in FIG. 2.

TABLE 1

[Overall Data]

m = 8.0
EPD = 36
θ = 6.5
fo = 132.7
fe = 16.6

[Lens Data]

| Surface number | r | d | nd | νd | |
|---|---|---|---|---|---|
| 1 | ∞ | 3.0 | 1.516800 | 64.17 | |
| 2 | ∞ | 0.1 | 1.527600 | 34.71 | |
| 3 | ∞ | 0.1 | 1.556900 | 50.17 | (Diffraction surface Co) |
| 4 | ∞ | 0.5 | | | |
| 5 | 72.5284 | 6.7 | 1.516800 | 64.20 | |
| 6 | −73.0000 | 2.4 | 1.688930 | 31.16 | |
| 7 | −252.7703 | 0.5 | | | |
| 8 | 59.6464 | 5.0 | 1.516800 | 64.20 | |
| 9 | 172.3308 | 30.0 | | | |
| 10 | 273.2629 | 2.0 | 1.516800 | 64.20 | |
| 11 | 38.6887 | 9.7 | | | |
| 12 | ∞ | 29.9 | 1.568830 | 56.04 | |
| 13 | ∞ | 0.4 | | | |
| 14 | ∞ | 47.9 | 1.516800 | 64.20 | |
| 15 | ∞ | 14.5 | | | |
| 16 | 99.0906 | 0.1 | 1.556900 | 50.17 | |
| 17 | 99.0906 | 0.1 | 1.527600 | 34.71 | (Diffraction surface Ce) |
| 18 | 99.0906 | 2.0 | 1.795040 | 28.56 | |
| 19 | 19.0015 | 7.6 | 1.497820 | 82.52 | |
| 20 | −17.9878 | 0.2 | | | |
| 21 | 16.6767 | 5.0 | 1.589130 | 61.09 | |
| 22 (EP) | −490.7856 | 16.0 | | | |

[Diffraction Surface Data]

Surface 3   C2 = −5.0000E−05, C4 = 7.8000E−09
Surface 17  C2 = −1.6720E−03, C4 = 8.9141E−06

[Conditional Expression Correspondence Values]

Ko = 7.53E−03
Kodoe = 1.00E−04
Ke = 6.02E−02
Kedoe = 3.34E−03
Pe = 5.56E−02
FNO = 3.7

| Conditional expression (1) | (Po/FNO)/{Pe/(a × m)} = 3.4 |
| Conditional expression (2) | Po = 1.33E−02 |
| Conditional expression (3) | nd1 = 1.527600 |
| Conditional expression (4) | (nF1 − nC1) = 0.0152 |
| Conditional expression (5) | nd2 = 1.556900 |
| Conditional expression (6) | (nF2 − nC2) = 0.0111 |

It can thus be seen from the table of data in Table 1 that in the telescope optical system according to the present example, the above conditional expressions (1) through (6) are satisfied.

Figure 3:
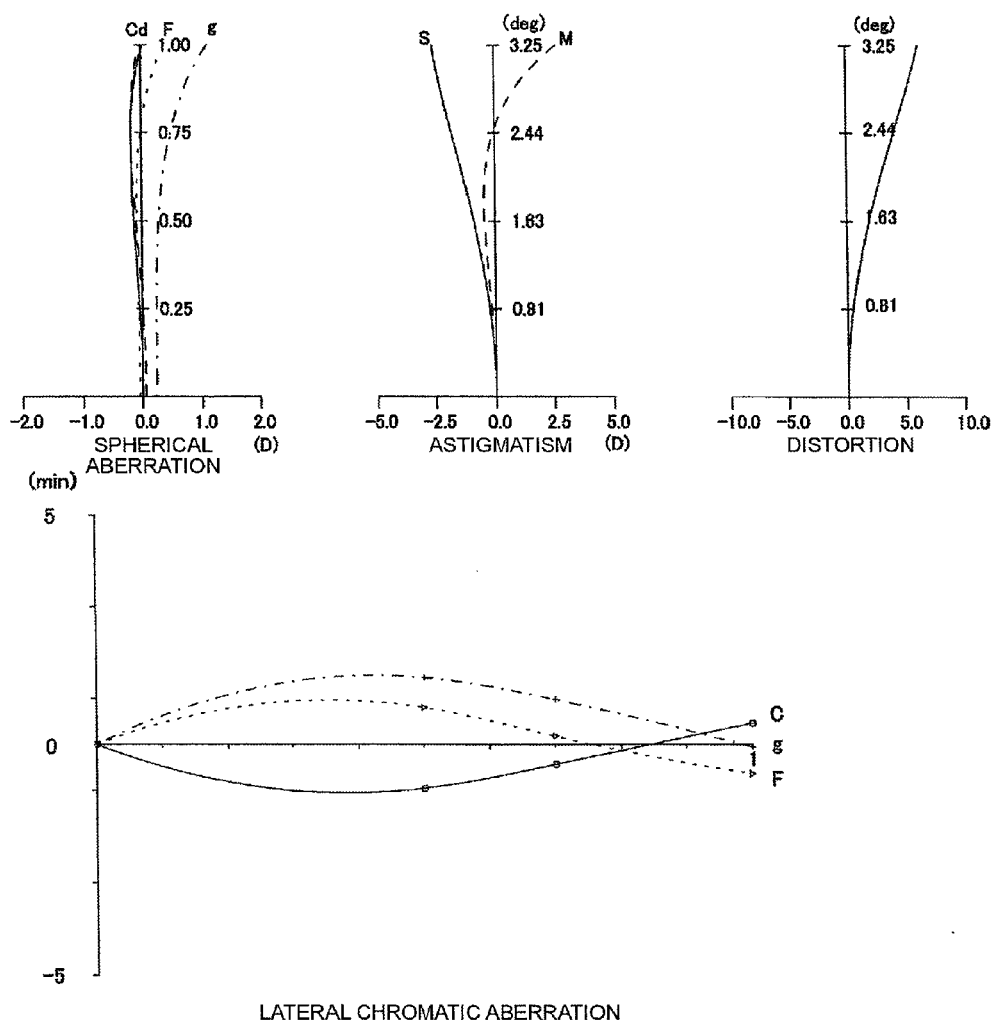
FIG. 3 depicts graphs showing various aberrations of the telescope optical system according to example 1.
Figure 4:
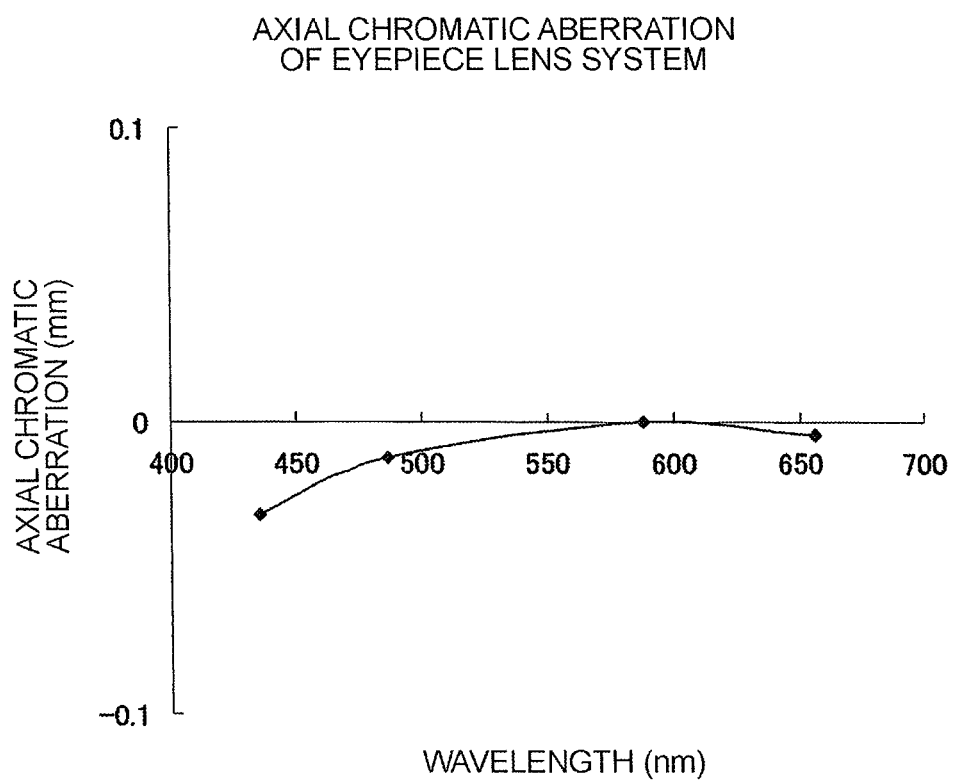
FIG. 4 is a graph showing the axial chromatic aberration of the eyepiece lens system according to example 1.

FIG. 3 is a spherical aberration diagram, astigmatism diagram, distortion diagram, and lateral chromatic aberration diagram in the telescope optical system according to example 1. FIG. 4 represents the axial chromatic aberration when a unitary eyepiece lens system forming the telescope optical system according to example 1 is traced from the eye-point side.

Each of the aberration diagrams shown in FIG. 3 shows the telescope optical system according to the present example, in light-ray-tracing order from the object-side. In the spherical aberration diagram, d, C, F, and g represent the aberration in relation to the d-line (wavelength=586.562 nm), C-line (wavelength=656.273 nm), F-line (wavelength=486.133 nm), and g-line (wavelength=435.835 nm) respectively. In the astigmatism diagram, S represents the sagittal plane and M represents the meridional plane. In the lateral chromatic aberration diagram, the d-line (wavelength=586.562 nm) is taken to be a reference; and C, F, and g represent the C-line (wavelength=656.273 nm), F-line (wavelength=486.133 nm), and g-line (wavelength=435.835 nm) respectively. In the spherical aberration diagram, the vertical axis represents normalized values, where the maximum value of the entrance pupil diameter has been set to 1, and the horizontal axis represents the value of the aberration (diopter) in each light beam. In the astigmatism diagram, the vertical axis represents the angle (degrees) between the incident light beam and the optical axis when light is incident from the object, and the horizontal axis represents the value of the aberration (dioptre) in each light beam. In the distortion diagram, the vertical axis represents the angle (degrees) between the incident light beam and the optical axis when light is incident from the object, and the horizontal axis represents the proportion of aberration as a percentage (% value). In the lateral chromatic aberration diagram, the horizontal axis represents values that have been normalized with the real field of view being set to 1, and the vertical axis represents the value of the aberration (minutes). The above description of the aberration diagrams is common to all of the examples, and shall not be [repeated] in the following descriptions.

As evident in the aberration diagrams shown in FIG. 3, it can be seen that various aberrations, particularly axial chromatic aberration and lateral chromatic aberration, are corrected in a satisfactory manner in the telescope optical system according to example 1. Also, as evident in the aberration diagram shown in FIG. 4, it can be seen that when the d-line is taken to be the reference wavelength, the axial chromatic aberration of the C-line is corrected excessively, and the axial chromatic aberration of the F-line is smaller.

Example 2

Figure 5:
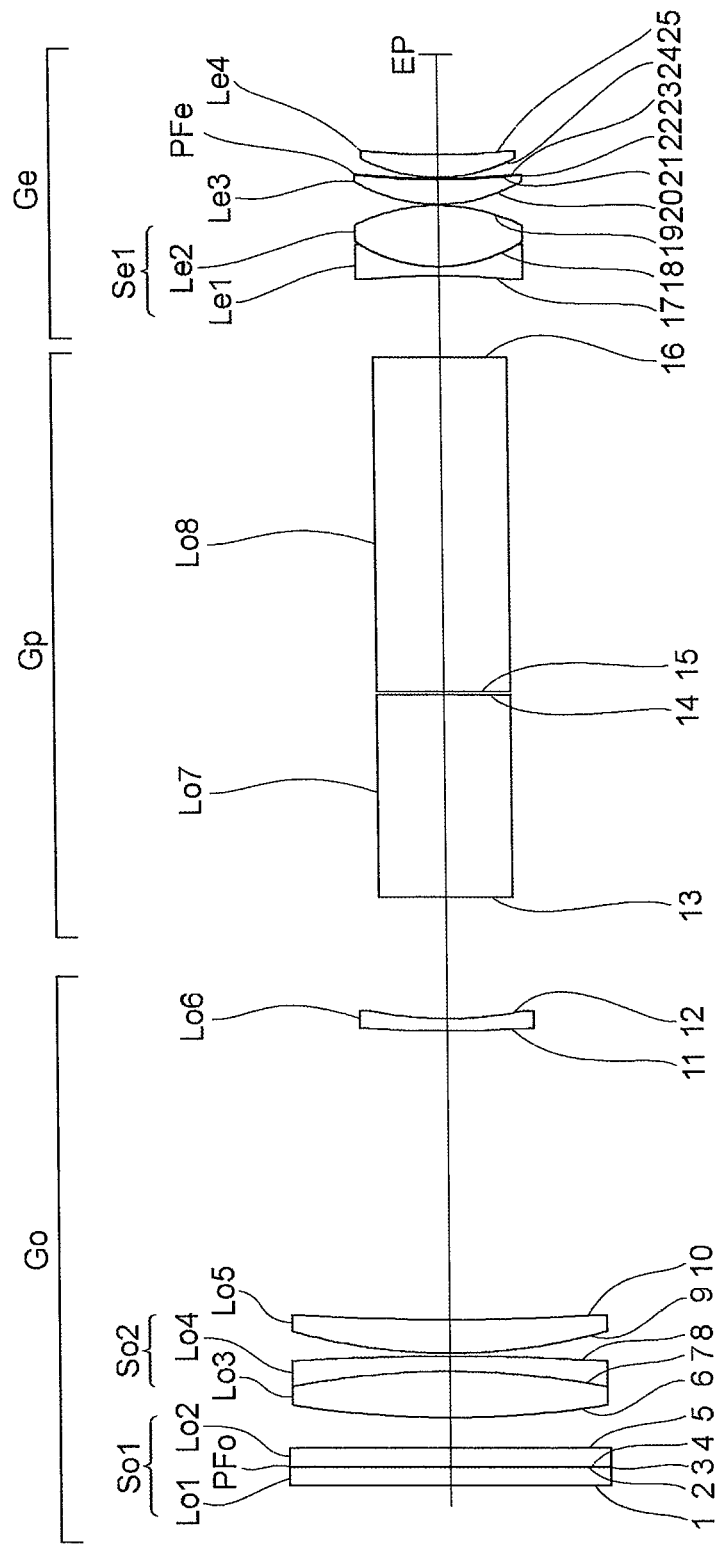
FIG. 5 represents the lens configuration of the telescope optical system according to example 2.

A description will now be given for a telescope optical system according to example 2 with reference to FIGS. 5 through 7 and Table 2. As shown in FIG. 5, the telescope optical system according to example 2 has, arranged in sequence along the optical axis in order from the object, an objective lens system Go, an upright optical system Gp, and an eyepiece lens system Ge.

The objective lens system Go has, arranged along the optical axis in order from the object, a cemented lens So1 comprising cementing of parallel flat plates Lo1, Lo2; a cemented lens So2 comprising cementing of a lens Lo3 having positive refractive power and a lens Lo4 having negative refractive power; a lens Lo5 having positive refractive power; and a lens Lo6 having negative refractive power. The cemented lenses So1, So2 are cemented lenses having positive refractive power overall. The upright optical system Gp has prisms Lo7, Lo8.

The eyepiece lens system Ge has, arranged along the optical axis in order from the object, a cemented lens Se1 comprising cementing of a lens Le1 having negative refractive power and a lens Le2 having positive refractive power, and lenses Le3, Le4 having positive refractive power. The cemented lens Se1 is a cemented lens having positive refractive power overall.

In the present example, the contact multi-layer-type diffractive optical element PFo described above is incorporated between the parallel flat plates Lo1, Lo2 forming the objective lens system. Go. Also, the contact multilayer-type diffractive optical element PFe described above is incorporated into the eye-point-side surface of the lens Le3 having positive refractive power and forming the eyepiece lens system Ge.

The values for each item of data in example 2 are shown in Table 2. Surface numbers 1 to 25 in Table 2 correspond to surfaces 1 to 25 shown in FIG. 5.

TABLE 2

[Overall Data]

m = 10.5
EPD = 45
θ = 6.1
fo = 170.6
fe = 16.2

[Lens Data]

| Surface number | r | d | nd | νd | |
|---|---|---|---|---|---|
| 1 | ∞ | 3.0 | 1.516800 | 64.11 | |
| 2 | ∞ | 0.05 | 1.527600 | 34.71 | |
| 3 | ∞ | 0.05 | 1.556900 | 50.17 | (Diffraction surface Co) |
| 4 | ∞ | 3.0 | 1.516800 | 64.11 | |
| 5 | ∞ | 5.0 | | | |
| 6 | 136.0628 | 7.5 | 1.516800 | 64.11 | |
| 7 | −112.9560 | 2.5 | 1.717362 | 29.52 | |
| 8 | −347.5000 | 0.5 | | | |
| 9 | 77.9870 | 5.5 | 1.516800 | 64.11 | |
| 10 | 342.8874 | 47.2 | | | |
| 11 | 183.8022 | 2.0 | 1.516800 | 64.11 | |
| 12 | 53.0040 | 20.0 | | | |
| 13 | ∞ | 33.3 | 1.568832 | 56.34 | |
| 14 | ∞ | 0.5 | | | |
| 15 | ∞ | 54.8 | 1.516800 | 64.11 | |
| 16 | ∞ | 13.4 | | | |
| 17 | −98.6070 | 1.5 | 1.805181 | 25.43 | |
| 18 | 21.0243 | 10.0 | 1.696797 | 55.52 | |
| 19 | −25.7116 | 0.2 | | | |
| 20 | 22.7973 | 4.0 | 1.620411 | 60.29 | |
| 21 | 95.5367 | 0.1 | 1.527600 | 34.71 | |
| 22 | 95.5367 | 0.1 | 1.556900 | 50.17 | (Diffraction surface Ce) |
| 23 | 95.5367 | 0.2 | | | |
| 24 | 22.7973 | 3.7 | 1.620411 | 60.29 | |
| 25 (EP) | 95.5367 | 16.3 | | | |

[Diffraction Surface Data]

Surface 3   C2 = −4.2000E−05, C4 = 1.0100E−08
Surface 22  C2 = −8.8814E−04, C4 = 2.5274E−06

[Conditional Expression Correspondence Values]

Ko = 5.86E−03
Kodoe = 8.40E−05
Ke = 6.18E−02
Kedoe = 1.78E−03
Pe = 2.88E−02
FNO = 3.7

| Conditional expression (1) | (Po/FNO)/{Pe/(a × m)} = 8.5 |
| Conditional expression (2) | Po = 1.43E−02 |
| Conditional expression (3) | nd1 = 1.527600 |
| Conditional expression (4) | (nF1 − nC1) = 0.0152 |

TABLE 2-continued

| | |
|---|---|
| Conditional expression (5) | nd2 = 1.556900 |
| Conditional expression (6) | (nF2 − nC2) = 0.0111 |

It can thus be seen from the table of data in Table 2 that in the telescope optical system according to the present example, the above conditional expressions (1) through (6) are satisfied.

Figure 6:
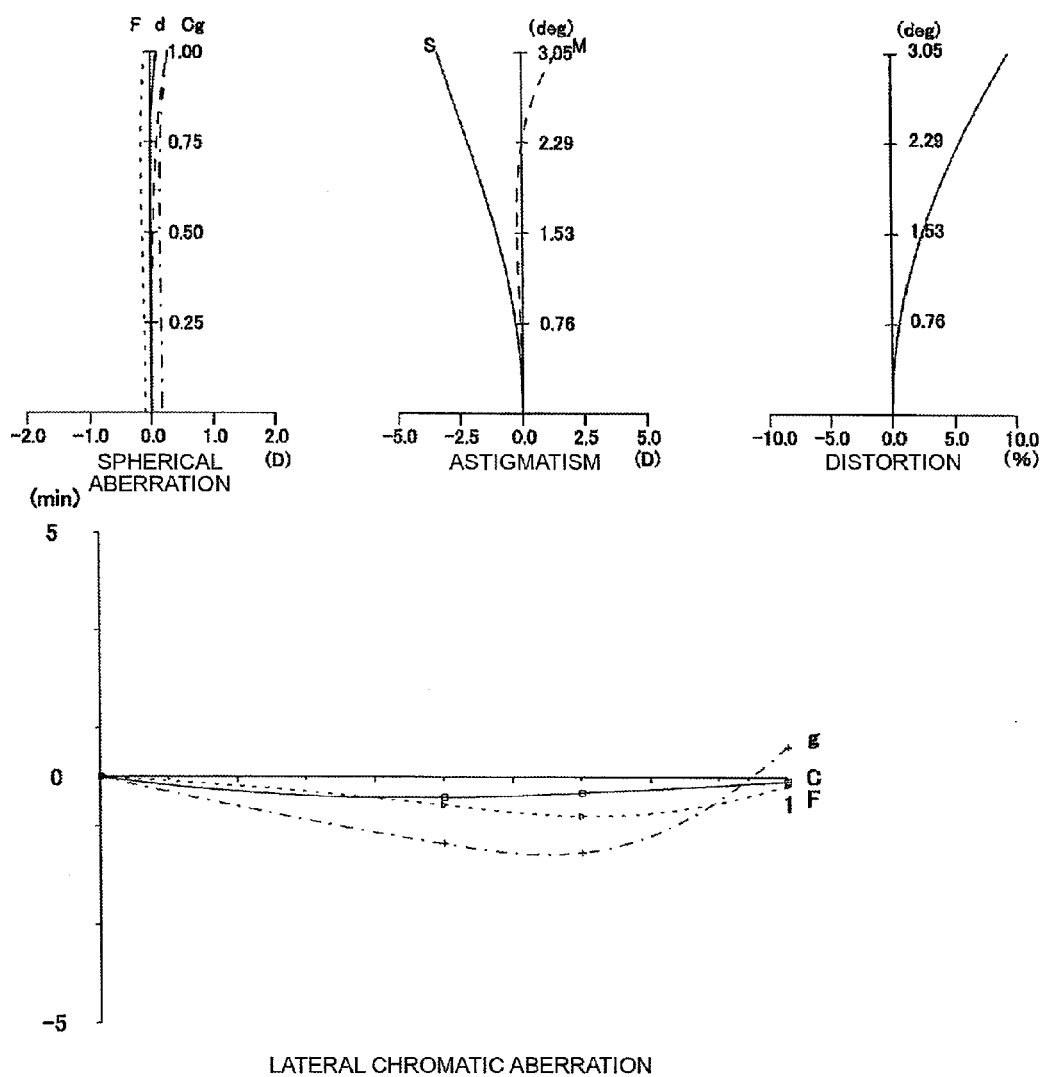
FIG. 6 depicts graphs showing various aberrations of the telescope optical system according to example 2.
Figure 7:
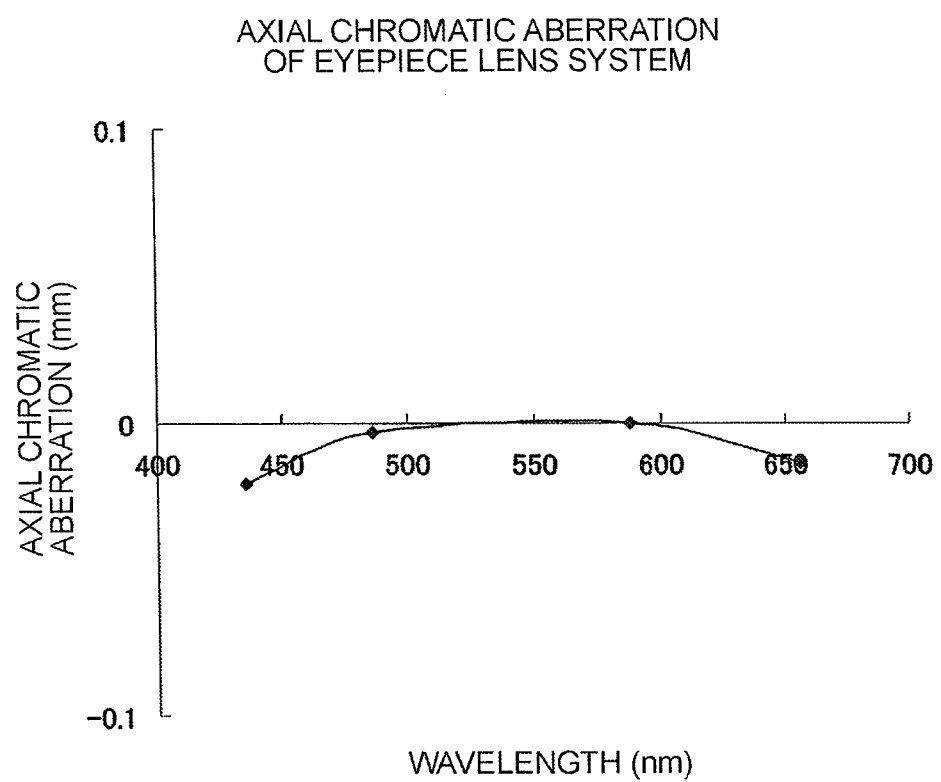
FIG. 7 is a graph showing the axial chromatic aberration of the eyepiece lens system according to example 2.

FIG. 6 is a spherical aberration diagram, astigmatism diagram, distortion diagram, and lateral chromatic aberration diagram in the telescope optical system according to example 2. FIG. 7 represents the axial chromatic aberration when a unitary eyepiece lens system forming the telescope optical system according to example 2 is traced from the eye-point side.

As evident in the aberration diagrams shown in FIG. 6, it can be seen that various aberrations, particularly axial chromatic aberration and lateral chromatic aberration, are corrected in a satisfactory manner in the telescope optical system according to example 2. Also, as evident in the aberration diagram shown in FIG. 7 it can be seen that when the d-line is taken to be the reference wavelength, the axial chromatic aberration of the C-line is corrected excessively, and the axial Chromatic aberration of the F-line is smaller.

Example 3

Figure 8:
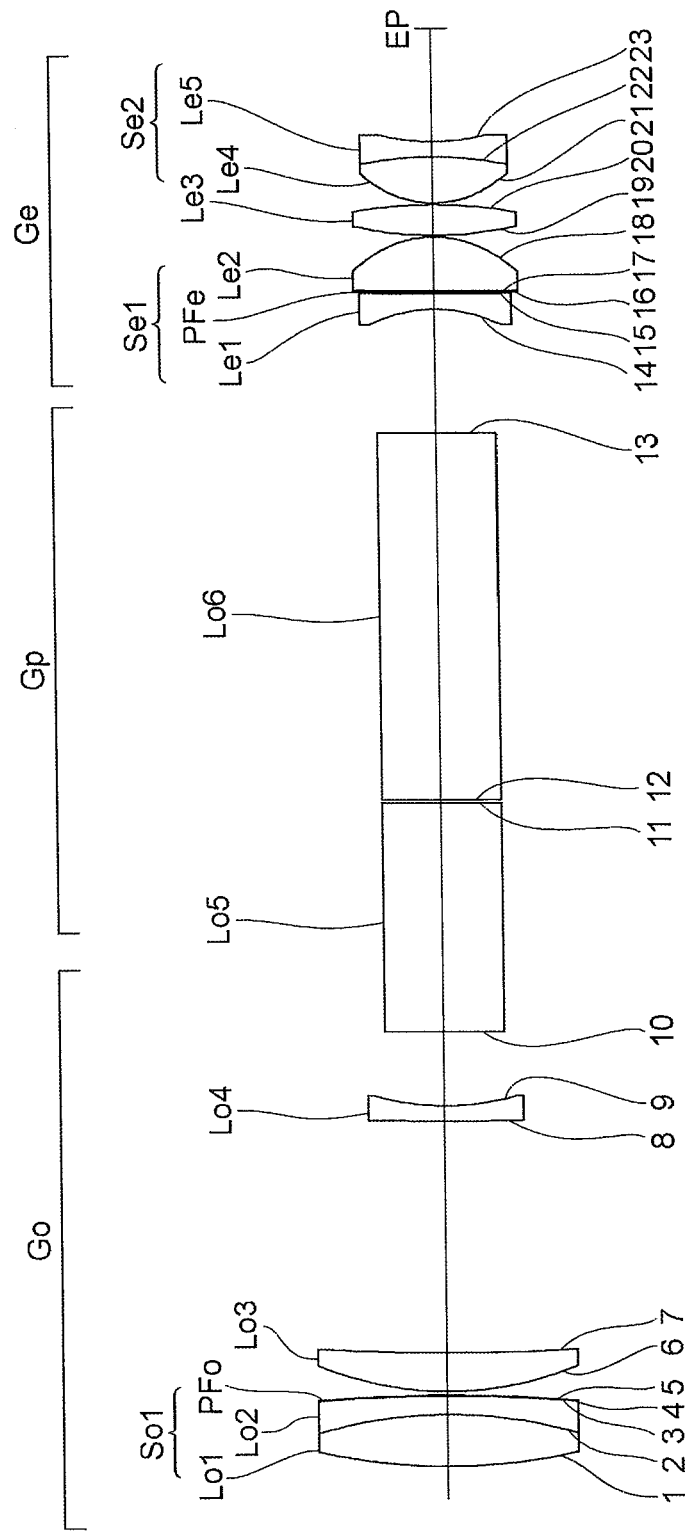
FIG. 8 represents the lens configuration of the telescope optical system according to example 3.

A description will now be given for a telescope optical system according to example 3 with reference to FIGS. 8 through 10 and Table 3. As shown in FIG. 8, the telescope optical system according to example 3 has, arranged in sequence along the optical axis in order from the object, an objective lens system Go, an upright optical system Gp, and an eyepiece lens system Ge.

The objective lens system Go has, arranged along the optical axis in order from the object, a cemented lens So1 comprising cementing of a lens Lo1 having positive refractive power and a lens Lo2 having negative refractive power; a lens Lo3 having positive refractive power; and a lens Lo4 having negative refractive power. The cemented lens Sol is a cemented lens having positive refractive power overall. The upright optical system Gp has prisms Lo5, Lo6.

The eyepiece lens system Ge has, arranged along the optical axis in order from the object, a cemented lens Se1 comprising cementing of a lens Le1 having negative refractive power and a lens Le2 having positive refractive power; a lens Le3 having positive refractive power; and a cemented lens Se2 comprising cementing of a lens Le4 having positive refractive power and a lens Le5 having negative refractive power. The cemented lenses Se1, Se2 are cemented lenses having positive refractive power overall.

In the present example, the contact multi-layer-type diffractive optical element PFo described above is incorporated into the eye-point-side surface of the lens Lo2 having negative refractive power and forming the cemented lens So1 of the objective lens system Go. Also, the contact multi-layer-type diffractive optical element PFe described above is incorporated between the lens Le1 having negative refractive power, and the lens Le2 having positive refractive power, the lenses forming the cemented lens Se1 of the eyepiece lens system Ge.

The values for each item of data in example 3 are shown in Table 3. Surface numbers 1 to 23 in Table 3 correspond to surfaces 1 to 23 shown in FIG. 8.

TABLE 3

[Overall Data]

m = 8.0
EPD = 36
θ = 7.0
fo = 132.2
fe = 16.6

[Lens data]

| Surface number | r | d | nd | νd | |
|---|---|---|---|---|---|
| 1 | 98.4300 | 6.7 | 1.516800 | 64.20 | |
| 2 | −78.5856 | 2.4 | 1.688930 | 31.16 | |
| 3 | −273.1872 | 0.05 | 1.527600 | 34.71 | |
| 4 | −273.1872 | 0.05 | 1.556900 | 50.17 | (Diffraction surface Co) |
| 5 | −273.1872 | 0.5 | | | |
| 6 | 57.2744 | 5.0 | 1.516800 | 64.20 | |
| 7 | 400.1262 | 30.0 | | | |
| 8 | 720.9295 | 2.0 | 1.516800 | 64.20 | |
| 9 | 43.4184 | 9.7 | | | |
| 10 | ∞ | 29.9 | 1.568830 | 56.04 | |
| 11 | ∞ | 0.4 | | | |
| 12 | ∞ | 47.9 | 1.516800 | 64.20 | |
| 13 | ∞ | 16.0 | | | |
| 14 | −24.9790 | 2.0 | 1.805182 | 25.35 | |
| 15 | 700.8713 | 0.2 | 1.527600 | 34.71 | |
| 16 | 700.8713 | 0.2 | 1.556900 | 50.17 | (Diffraction surface Ce) |
| 17 | 700.8713 | 7.0 | 1.664460 | 35.83 | |
| 18 | −18.7578 | 0.2 | | | |
| 19 | 60.6934 | 4.0 | 1.620409 | 60.14 | |
| 20 | −77.4658 | 0.2 | | | |
| 21 | 17.2844 | 6.0 | 1.692111 | 54.55 | |
| 22 | −63.8725 | 2.0 | 1.805182 | 25.35 | |
| 23 (EP) | 39.4682 | 14.6 | | | |

[Diffraction Surface Data]

| | |
|---|---|
| Surface 4 | C2 = −5.4597E−05, C4 = 2.0695E−08 |
| Surface 16 | C2 = −1.4844E−03, C4 = 3.9901E−06 |

[Conditional Expression Correspondence Values]

Ko = 7.56E−03
Kodoe = 1.09E−04
Ke = 6.01E−02
Kedoe = 2.97E−03
Pe = 4.94E−02
FNO = 3.7

| | |
|---|---|
| Conditional expression (1) | (Po/FNO)/{Pe/(a × m)} = 4.4 |
| Conditional expression (2) | Po = 1.44E−02 |
| Conditional expression (3) | nd1 = 1.527600 |
| Conditional expression (4) | (nF1 − nC1) = 0.0152 |
| Conditional expression (5) | nd2 = 1.556900 |
| Conditional expression (6) | (nF2 − nC2) = 0.0111 |

It can thus be seen from the table of data in Table 3 that in the telescope optical system according to the present example, the above conditional expressions (1) through (6) are satisfied.

Figure 9:
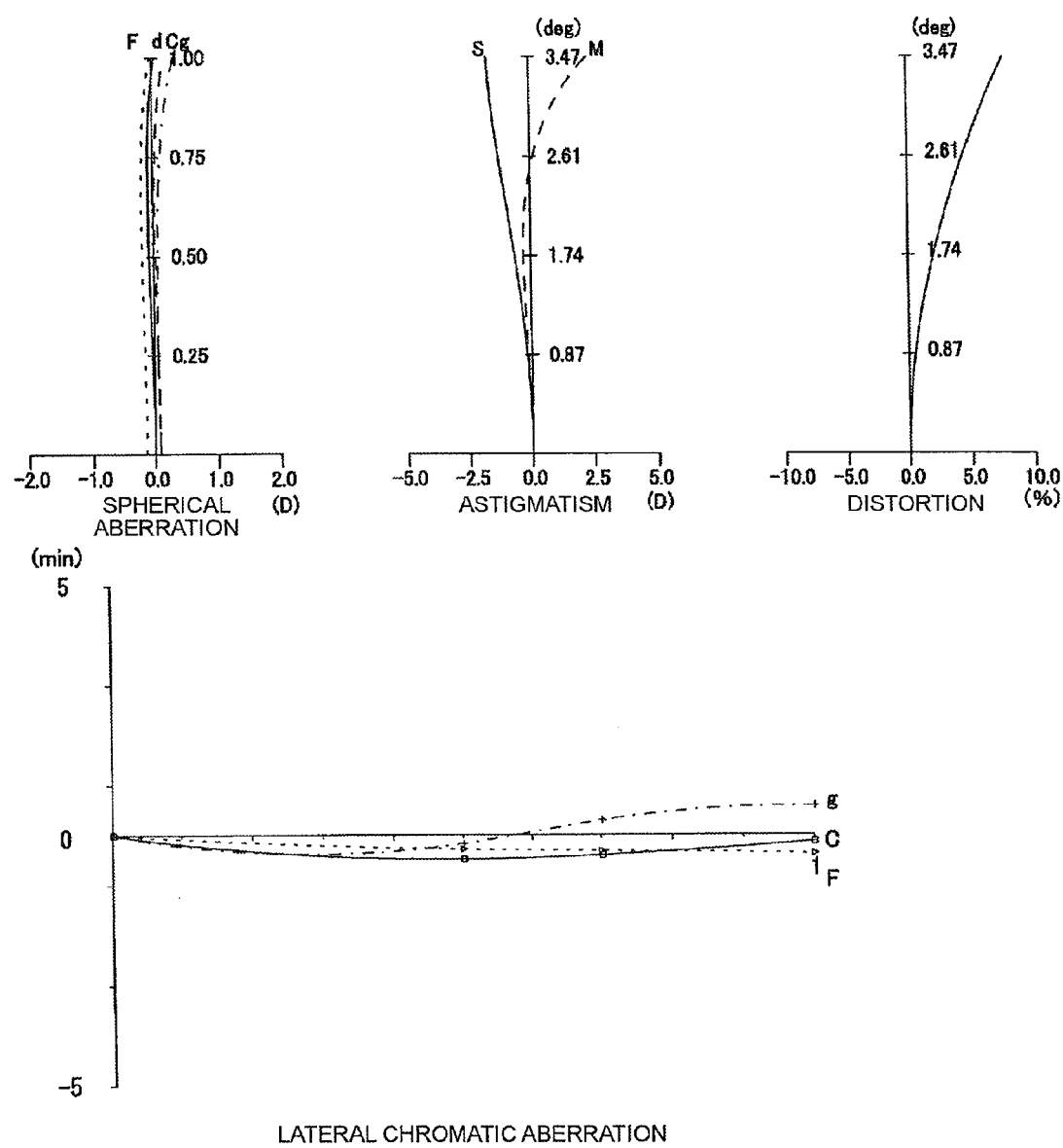
FIG. 9 depicts graphs showing various aberrations of the telescope optical system according to example 3.
Figure 10:
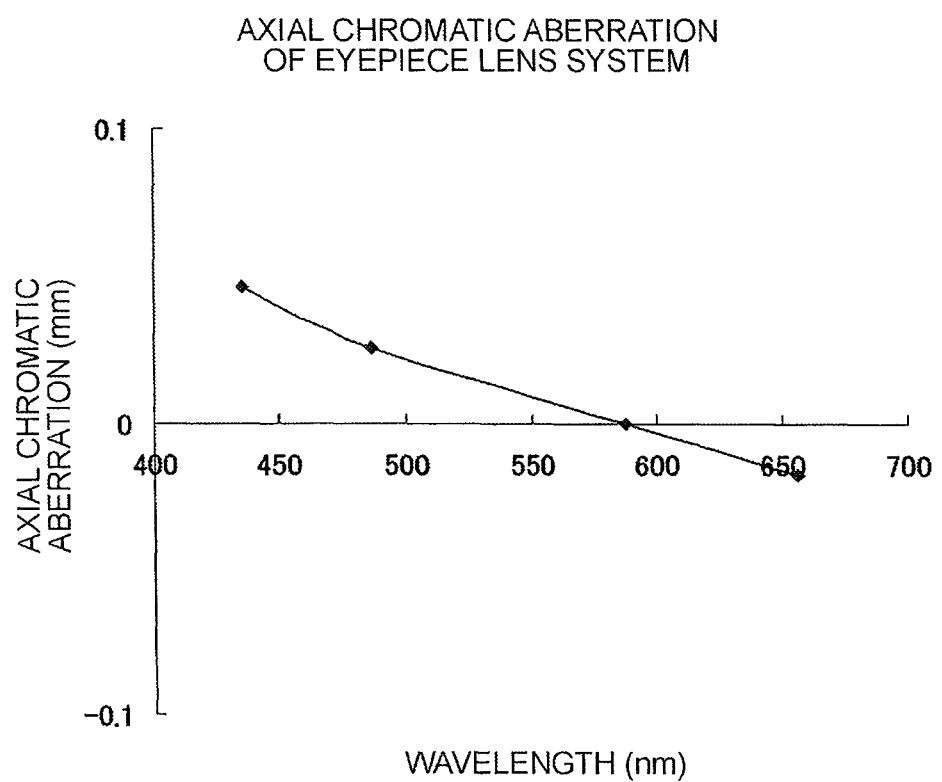
FIG. 10 is a graph showing the axial chromatic aberration of the eyepiece lens system according to example 3.

FIG. 9 is a spherical aberration diagram, astigmatism diagram, distortion diagram, and lateral chromatic aberration diagram in the telescope optical system according to example 3. FIG. 10 represents the axial chromatic aberration when a unitary eyepiece lens system forming the telescope optical system according to example 3 is traced from the eye-point side.

As evident in the aberration diagrams shown in FIG. 9, it can be seen that various aberrations, particularly axial chromatic aberration and lateral chromatic aberration, are corrected in a satisfactory manner in the telescope optical system according to example 3. Also, as evident in the aberration diagram shown in FIG. 10, it can be seen that when the d-line is taken to be the reference wavelength, the axial chromatic aberration of the C-line is corrected excessively.

Example 4

Figure 11:
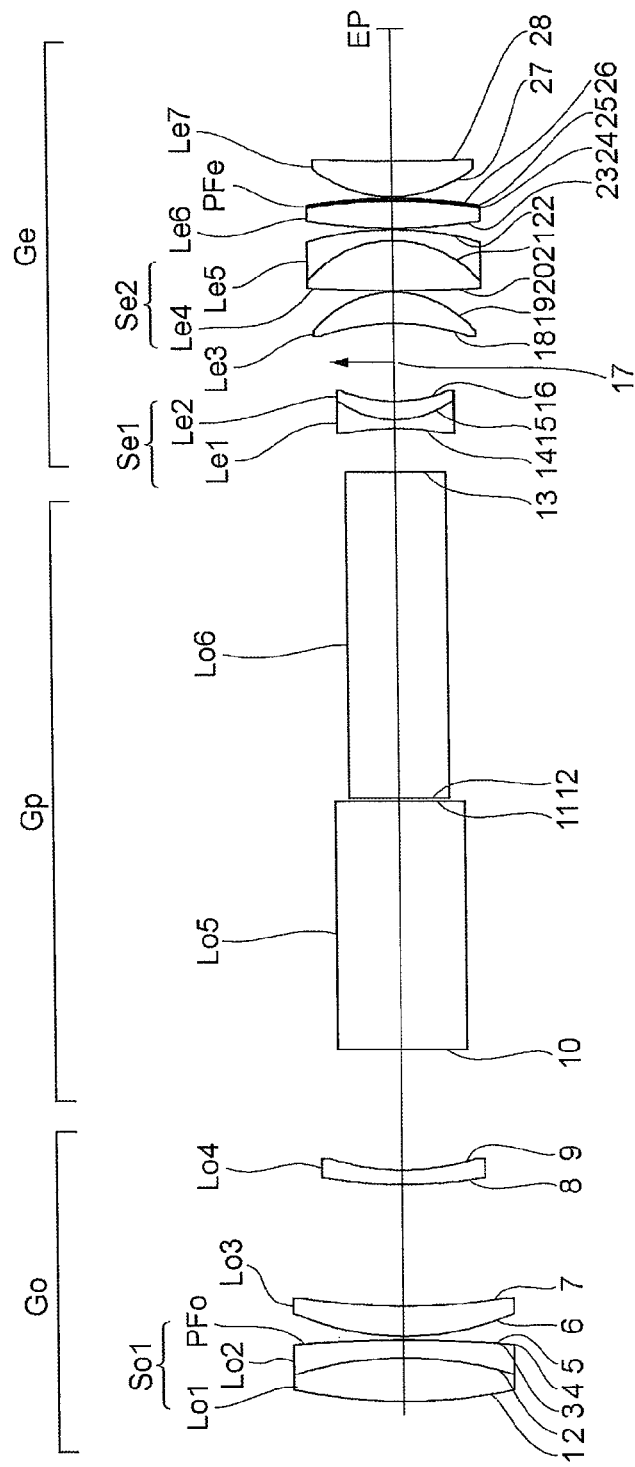
FIG. 11 represents the lens configuration of the telescope optical system according to example 4.

A description will now be given for a telescope optical system according to example 4 with reference to FIGS. 11. through 13 and Table 4. As shown in FIG. 11, the telescope optical system according to example 4 has, arranged in sequence along the optical axis in order from the object, an objective lens system Go, an upright optical system Gp, and an eyepiece lens system Ge.

The objective lens system Go has, arranged along the optical axis in order from the object, a cemented lens So1 comprising cementing of a lens Lo1 having positive refractive power and a lens Lo2 having negative refractive power; a lens Lo3 having positive refractive power; and a lens Lo4 having negative refractive power. The cemented lens So1 is a cemented lens having positive refractive power overall. The upright optical system Gp has prisms Lo5, Lo6.

The eyepiece lens system Ge has, arranged along the optical axis in order from the object, a cemented lens Se1 comprising cementing of a lens Le1 having negative refractive power and a lens Le2 having positive refractive power; a lens Le3 having positive refractive power; and a cemented lens Se2 comprising cementing of a lens Le4 having positive refractive power and a lens Le5 having negative refractive power. The cemented lenses Se1, Se2 are cemented lenses having positive refractive power overall.

In the present example, the contact multi-layer-type diffractive optical element PFo described above is incorporated into the eye-point-side surface of the lens Lo2 having negative refractive power and forming the cemented lens So1 of the objective lens system Go. Also, the contact multi-layer-type diffractive optical element PFe described above is incorporated into the eye-point-side surface of the lens Le6 having positive refractive power and forming the eyepiece lens system Ge.

The values for each item of data in example 4 are shown in Table 4. Surface numbers 1 to 28 in Table 4 correspond to surfaces 1 to 28 shown in FIG. 11.

TABLE 4

[Overall Data]

m = 8.0
EPD = 32
θ = 7.8
fo = 118.1
fe = 14.8

[Lens Data]

| Surface number | r | d | nd | vd | |
|---|---|---|---|---|---|
| 1 | 93.7522 | 6.0 | 1.516800 | 64.10 | |
| 2 | −65.8641 | 2.5 | 1.648311 | 33.75 | |
| 3 | −220.3076 | 0.01 | 1.527600 | 34.71 | |
| 4 | −220.3076 | 0.01 | 1.556900 | 50.17 | (Diffraction surface Co) |
| 5 | −220.3076 | 0.5 | | | |
| 6 | 48.3716 | 4.2 | 1.516800 | 64.10 | |
| 7 | 117.4024 | 16.9 | | | |
| 8 | 82.5080 | 2.0 | 1.516800 | 64.10 | |
| 9 | 40.2700 | 16.8 | | | |
| 10 | ∞ | 34.8 | 1.568829 | 56.05 | |
| 11 | ∞ | 0.4 | | | |
| 12 | ∞ | 45.7 | 1.516800 | 64.10 | |
| 13 | ∞ | 6.1 | | | |
| 14 | −42.3960 | 1.2 | 1.516800 | 64.10 | |
| 15 | 16.6258 | 2.6 | 1.713000 | 53.93 | |
| 16 | 27.2560 | 3.1 | | | |
| 17 | ∞ | 6.1 | (Image position of objective lens system Go) | | |
| 18 | −39.4700 | 4.4 | 1.620409 | 60.14 | |
| 19 | −17.4140 | 0.2 | | | |
| 20 | 246.6220 | 7.0 | 1.620409 | 60.14 | |
| 21 | −19.0000 | 1.5 | 1.805182 | 25.41 | |
| 22 | −55.6420 | 0.2 | | | |
| 23 | 93.5363 | 6.0 | 1.620409 | 60.14 | |
| 24 | −93.5363 | 0.2 | 1.527600 | 34.71 | |
| 25 | −93.5363 | 0.2 | 1.556900 | 50.17 | (Diffraction surface Ce) |
| 26 | −93.5363 | 0.2 | | | |
| 27 | 22.4370 | 5.0 | 1.589130 | 61.09 | |
| 28 (EP) | 530.3439 | 18.4 | | | |

[Diffraction Surface Data]

Surface 4   C2 = −5.0000E−05, C4 = 2.0000E−08
Surface 25  C2 = −7.5960E−04, C4 = 4.1262E−07

[Conditional Expression Correspondence Values]

Ko = 8.47E−03
Kodoe = 1.00E−04
Ke = 6.77E−02
Kedoe = 1.52E−03
Pe = 2.24E−02
FNO = 3.7

| Conditional expression (1) | (Po/FNO)/{Pe/(axm)} = 8.9 |
|---|---|
| Conditional expression (2) | Po = 1.18E−02 |
| Conditional expression (3) | nd1 = 1.527600 |
| Conditional expression (4) | (nF1 − nC1) = 0.0152 |
| Conditional expression (5) | nd2 = 1.556900 |
| Conditional expression (6) | (nF2 − nC2) = 0.0111 |

It can thus be seen from the table of data in Table 4 that in the telescope optical system according to the present example, the above conditional expressions (1) through (6) are satisfied.

Figure 12:
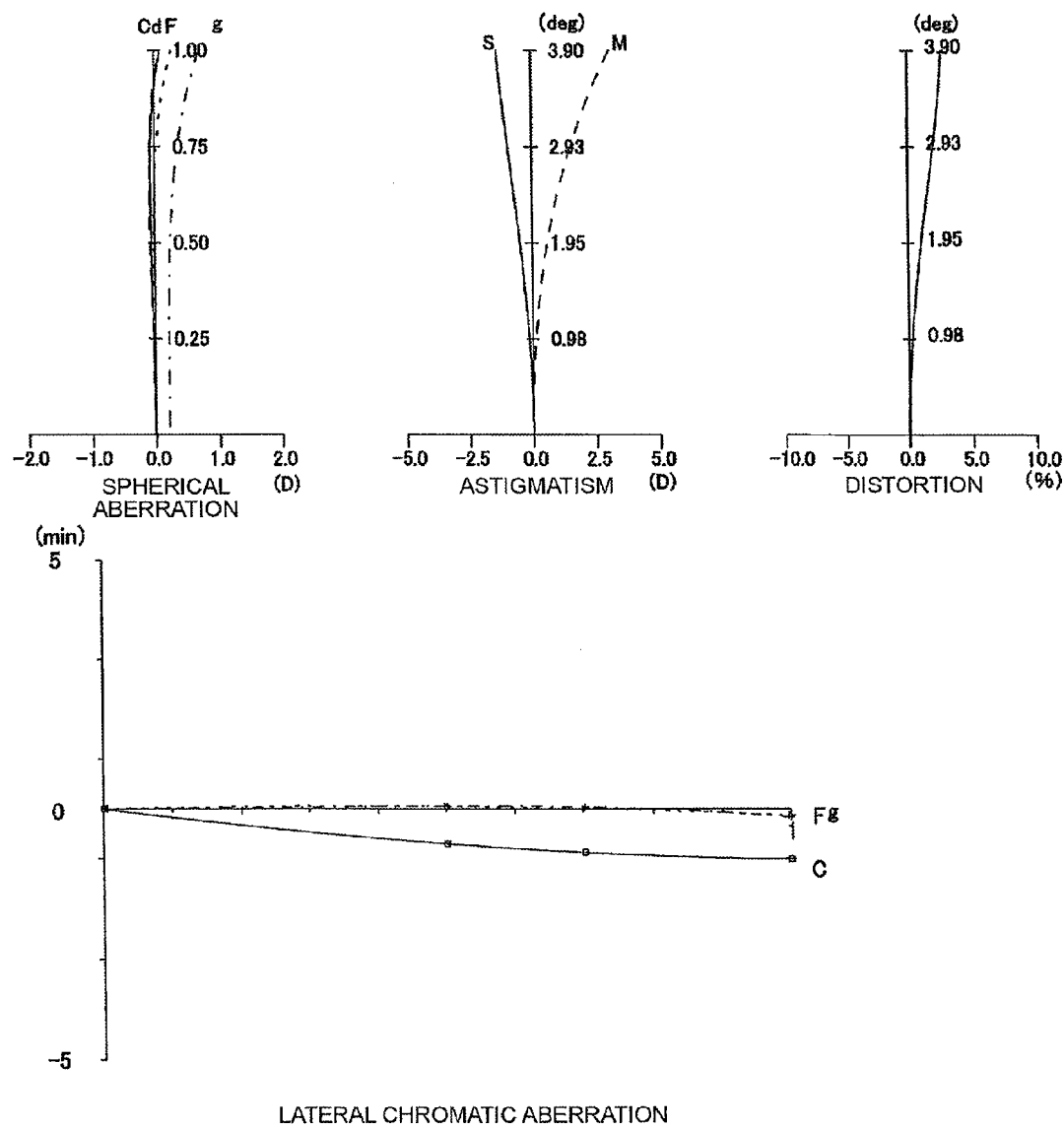
FIG. 12 depicts graphs showing various aberrations of the telescope optical system according to example 4.
Figure 13:
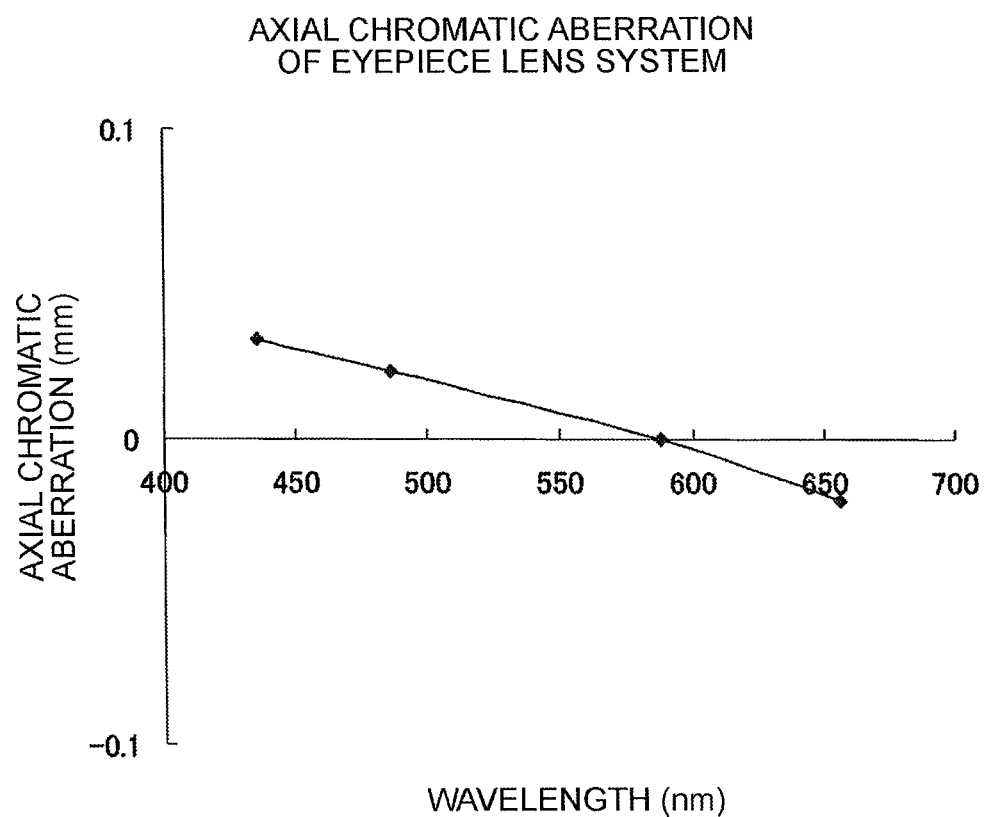
FIG. 13 is a graph showing the axial chromatic aberration of the eyepiece lens system according to example 4.

FIG. 12 is a spherical aberration diagram, astigmatism diagram, distortion diagram, and lateral chromatic aberration diagram in the telescope optical system according to example 4. FIG. 13 represents the axial chromatic aberration when a unitary eyepiece lens system forming the telescope optical system according to example 4 is traced from the eye-point side.

As evident in the aberration diagrams shown in FIG. 12, it can be seen that various aberrations, particularly axial chromatic aberration and lateral chromatic aberration, are corrected in a satisfactory manner in the telescope optical system according to example 4. Also, as evident in the aberration diagram shown in FIG. 13, it can be seen that when the d-line is taken to be the reference wavelength, the axial chromatic aberration of the C-line is corrected excessively.

Example 5

Figure 14:
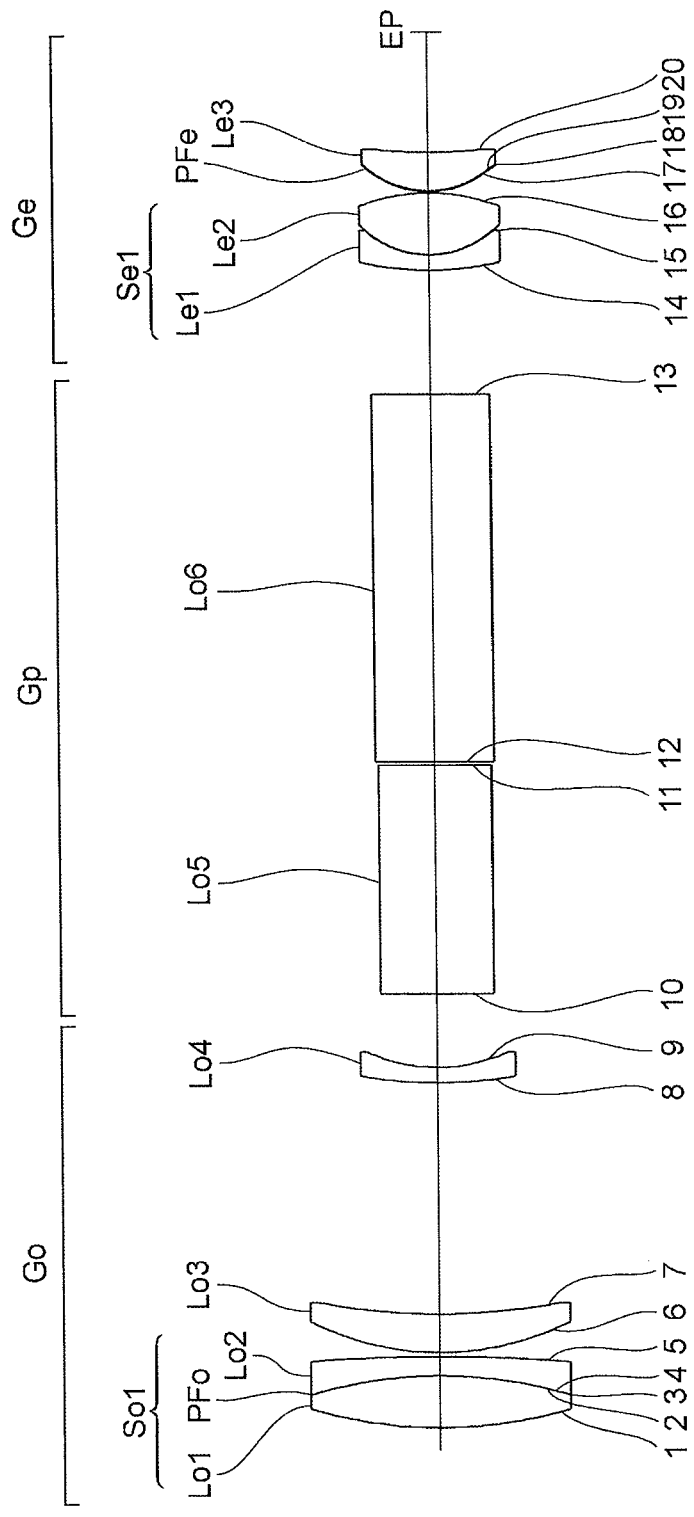
FIG. 14 represents the lens configuration of the telescope optical system according to example 5.
Figure 16:
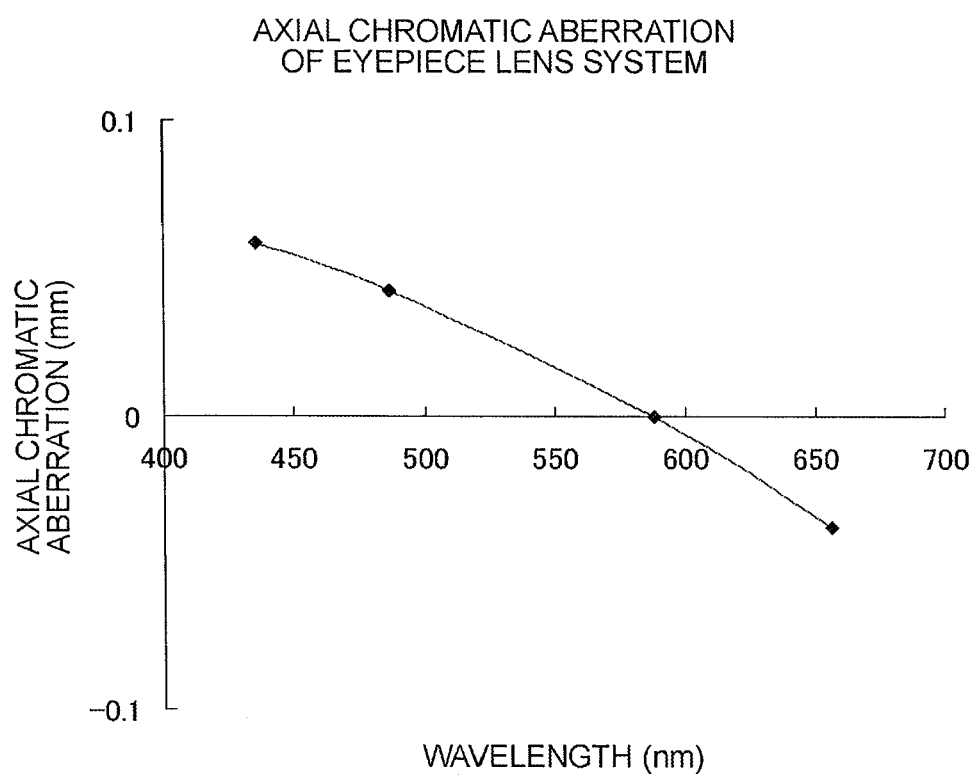
FIG. 16 is a graph showing the axial chromatic aberration of the eyepiece lens system according to example 5.

A description will now be given for a telescope optical system according to example 5 with reference to FIGS. 14 through 16 and Table 5. As shown in FIG. 14, the telescope optical system according to example 5 has, arranged in sequence along the optical axis in order from the object, an objective lens system Go, an upright optical system Gp, and an eyepiece lens system Ge.

The objective lens system Go has, arranged along the optical axis in order from the object, a cemented lens So1 comprising cementing of a lens Lo1 having positive refractive power and a lens Lo2 having negative refractive power; a lens Lo3 having positive refractive power; and a lens Lo4 having negative refractive power. The cemented lens So1 is a cemented lens having positive refractive power overall. The upright optical system Gp has prisms Lo5, Lo6.

The eyepiece lens system Ge has, arranged along the optical axis in order from the object, a cemented lens Se1 comprising cementing of a lens Le1 having negative refractive power and a lens Le2 having positive refractive power; and a lens Le3 having positive refractive power. The cemented lens Se1 is a cemented lens having positive refractive power overall.

In the present example, the contact multi-layer-type diffractive optical element PFo described above is incorporated between the lens Le1 having negative refractive power, and the lens Le2 having positive refractive power, the lenses forming the cemented lens So1 of the objective lens system Go. Also, the contact multi-layer-type diffractive optical element PFe described above is incorporated into the object-side surface of the lens Le3 having positive refractive power and forming the eyepiece lens system Ge.

The values for each item of data in example 5 are shown in Table 5. Surface numbers 1 to 20 in Table 5 correspond to surfaces 1 to 20 shown in FIG. 14.

TABLE 5

[Overall Data]

m = 10.5
EPD = 45
θ = 6.1
fo = 170.3
fe = 16.2

[Lens Data]

| Surface number | r | d | nd | vd | |
|---|---|---|---|---|---|
| 1 | 77.7927 | 6.7 | 1.516800 | 64.20 | |
| 2 | −76.0000 | 0.1 | 1.527600 | 33.41 | |
| 3 | −76.0000 | 0.1 | 1.556900 | 49.74 | (Diffraction surface Co) |
| 4 | −76.0000 | 2.4 | 1.688930 | 31.16 | |
| 5 | −270.7204 | 0.5 | | | |
| 6 | 48.5533 | 5.0 | 1.516800 | 64.20 | |
| 7 | 110.8840 | 30.0 | | | |
| 8 | 75.6340 | 2.0 | 1.516800 | 64.20 | |
| 9 | 28.2809 | 9.7 | | | |
| 10 | ∞ | 29.9 | 1.568830 | 56.04 | |
| 11 | ∞ | 0.4 | | | |
| 12 | ∞ | 52.4 | 1.516800 | 64.20 | |
| 13 | ∞ | 11.6 | | | |
| 14 | 52.8044 | 2.0 | 1.805181 | 25.43 | |
| 15 | 16.0000 | 8.0 | 1.696797 | 55.53 | |
| 16 | −33.2675 | 0.2 | | | |
| 17 | 16.1059 | 0.1 | 1.527600 | 33.41 | |
| 18 | 16.1059 | 0.1 | 1.556900 | 49.74 | (Diffraction surface Ce) |
| 19 | 16.1059 | 5.0 | 1.589130 | 61.0 | |
| 20 (EP) | 96.5806 | 15.6 | | | |

[Diffraction Surface Data]

Surface 3     C2 = −5.0000E−05, C4 = 3.2000E−08
Surface 18    C2 = −1.1000E−03, C4 = 6.2357E−06

[Conditional Expression Correspondence Values]

Ko = 5.87E−03
Kodoe = 9.77E−05
Ke = 6.18E−02

TABLE 5-continued

Kedoe = 1.25E−03
Pe = 2.02E−02
FNO = 3.7

| | |
|---|---|
| Conditional expression (1) | (Po/FNO)/{Pe/(axm)} = 14.0 |
| Conditional expression (2) | Po = 1.66E−02 |
| Conditional expression (3) | nd1 = 1.527600 |
| Conditional expression (4) | (nF1 − nC1) = 0.0152 |
| Conditional expression (5) | nd2 = 1.556900 |
| Conditional expression (6) | (nF2 − nC2) = 0.0111 |

It can thus be seen from the table of data in Table 5 that in the telescope optical system according to the present example, the above conditional expressions (1) through (6) are satisfied.

FIG. 15 is a spherical aberration diagram, astigmatism diagram, distortion diagram, and lateral chromatic aberration diagram in the telescope optical system according to example 5. FIG. 16 represents the axial chromatic aberration when a unitary eyepiece lens system forming the telescope optical system according to example 5 is traced from the eye-point side.

As evident in the aberration diagrams shown in FIG. 15, it can be seen that various aberrations, particularly axial chromatic Aberration and lateral chromatic aberration, are corrected in a satisfactory manner in the telescope optical system according to example 5. Also, as evident in the aberration diagram shown in FIG. 16, it can be seen that when the d-line is taken to be the reference wavelength, the axial chromatic aberration of the C-line is corrected excessively.

Figure 17:
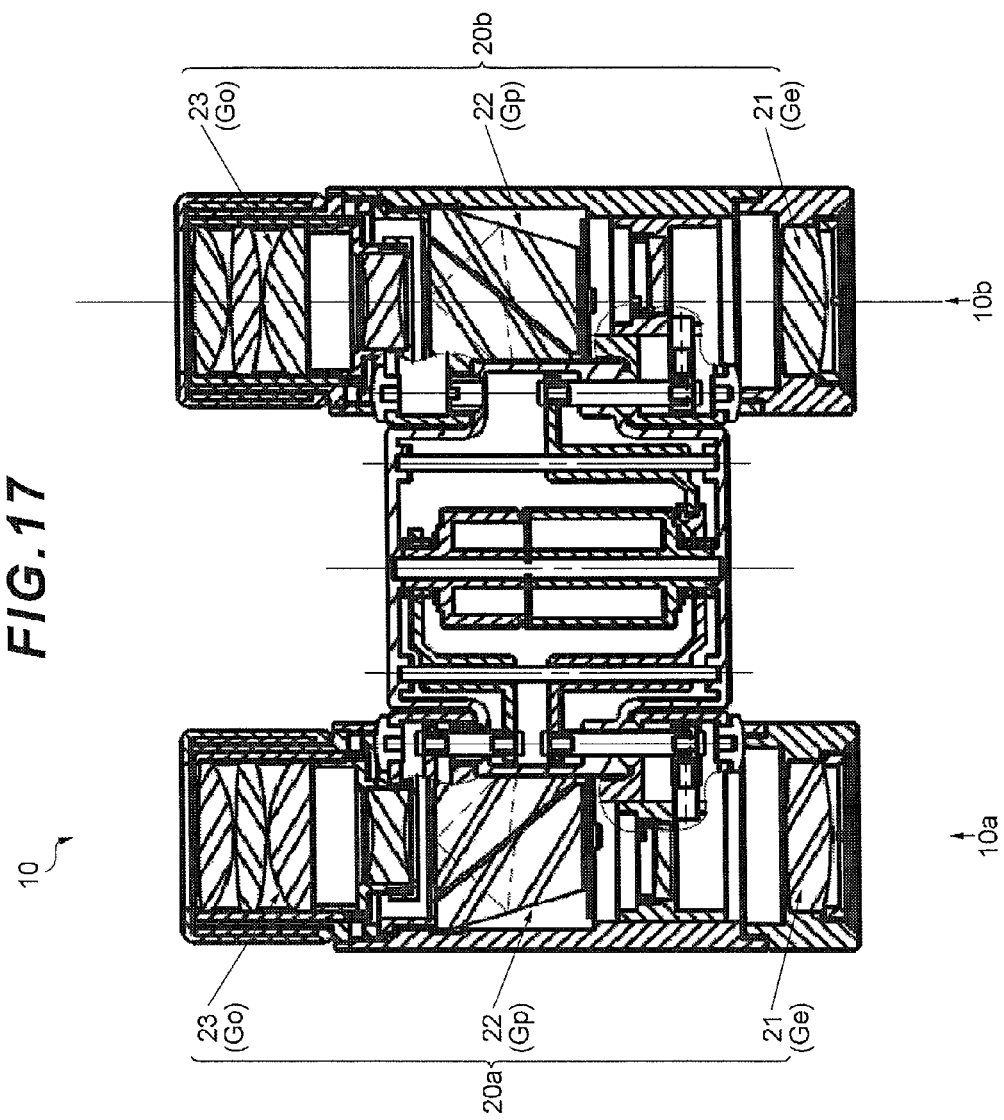
FIG. 17 represents the configuration of binoculars comprising the telescope optical system according to the present embodiment.

Next, a description will be given for binoculars provided with the telescope optical system according to the embodiment described above, with reference to FIG. 17. As shown in FIG. 17, the binoculars 10 have, within a pair of left and right observation lens barrels 10a, 10b corresponding to the left and right eyes of the observer, telescope optical systems 20a, 20b. Each of the telescope optical systems 20a, 20b comprises, in order along the optical axis from the object being observed, an objective lens system 21, an upright optical system 22, and an eyepiece lens system 23. Under this configuration, light from the object being observed is collected by the objective lens system 21 and an object image is formed. The object image is made upright by the upright optical system 22 and expanded by the eyepiece lens system 23. The observer can thereby observe, in expansion, the object being observed. In the present embodiment, the telescope optical system described in the above examples is used as the telescope optical systems 20a, 20b (i.e., the objective lens system 21, the upright optical system 22, and the eyepiece lens system 23 of the binoculars 10 respectively correspond to the objective lens system Go, the upright optical system Gp, and the eyepiece lens system Ge in the above examples). Therefore, binoculars according to the present embodiment in which a telescope optical system of such description is used can be readily manufactured and make it possible to correct various aberrations such as axial chromatic aberration and lateral chromatic aberration in a satisfactory manner.

In the embodiment described above, binoculars are given as an example of an optical device comprising the telescope optical system. However, the optical device is not limited to that shown; it being apparent that the telescope optical system of the present invention can be applied to a monocular viewer or other similar devices.

Thus, it is possible to provide a telescope optical system that can be readily manufactured and that can correct various aberrations such as axial chromatic aberration and lateral chromatic aberration in a satisfactory manner, and an optical device in which the telescope optical system is used.

In order to facilitate understanding of the present invention, essential elements of an embodiment were additionally described, albeit not by way of limitation.

For example, in the examples described above, two contact multi-layer-type diffractive optical elements are incorporated into the telescope optical system; however, this is not provided by way of limitation. Three or more diffractive optical elements may be provided instead.

Also, in the examples described above, contact multi-layer-type diffractive optical elements are incorporated into the telescope optical system; however, this is not provided by way of limitation. Separated multi-layer-type diffractive optical elements may be incorporated instead. An effect similar to that of contact diffractive optical elements is also obtained in such an instance.

EXPLANATION OF NUMERALS AND CHARACTERS

Go: Objective lens system of telescope optical system
Gp: Upright optical system of telescope optical system
Ge: Eyepiece lens system of telescope optical system
Lo: Constituent lens of objective lens system (single lens)
Le: Constituent lens of eyepiece lens system (single lens)
So: Constituent lens of objective lens system (cemented lens)
Se: Constituent lens of eyepiece lens system (cemented lens)
PF: Diffractive optical element
PFo: Diffractive optical element arranged in objective lens system
PFe: Diffractive optical element arranged in eyepiece lens system
Co: Diffractive optical-surface of diffractive optical element arranged in objective lens system
Ce: Diffractive optical surface of diffractive optical element arranged in eyepiece lens system
10: Binoculars (optical device)
10a, 10b: Observation lens barrel
20a, 20b: Telescope optical system
21: Objective lens system of binoculars
22: Upright optical system of binoculars
23: Eyepiece lens system of binoculars

The invention claimed is:

1. A telescope optical system having an objective lens system and an eyepiece lens system; the telescope optical system being characterized in that:
the objective lens system includes a first diffractive optical element, and a first cemented lens composed of a first lens having positive refractive power and a second lens having negative refractive power;
the eyepiece lens system includes a second diffractive optical element, and a second cemented lens composed of a third lens having negative refractive power and a fourth lens having positive refractive power;
the first diffractive optical element is composed of a first diffractive optical composing element having a first diffractive optical surface and a second diffractive optical composing element having a second diffractive optical surface, and the first diffractive optical composing element and the second diffractive optical composing element are arranged so that the first diffractive optical surface and the second diffractive optical surface face each other;
the second diffractive optical element is composed of a third diffractive optical composing element having a third diffractive optical surface and a fourth diffractive optical composing element having a fourth diffractive optical surface, and the third diffractive optical composing element and the fourth diffractive optical composing element are arranged so that the third diffractive optical surface and the fourth diffractive optical surface face each other; and
the condition represented by the following expression is satisfied:

$$2 \leq |(Po/FNO)/\{Pe/(\theta \times m)\}| \leq 15$$

where:
Ko represents the power of the objective lens system, Kodoe represents the power of the first diffractive optical element of the objective lens system, and Po is defined as Po=Kodoe/Ko;
Ke represents the power of the eyepiece lens system, Kedoe represents the power of the second diffractive optical element of the eyepiece lens system, and Pe is defined as Pe=Kedoe/Ke; and
FNO represents the F-number of the objective lens system, $\theta$ represents the real field of view of the telescope optical system, and m represents the magnification of the telescope optical system.

2. The telescope optical system according to claim 1, characterized in that a condition represented by the following expression:

$$0.007 \leq |Po| \leq 0.018$$

is satisfied.

3. The telescope optical system according to claim 1, characterized in that the first cemented lens of the objective lens system has positive refractive power overall.

4. The telescope optical system according to claim 1, characterized in that in the first cemented lens of the objective lens system, the first lens having positive refractive power and the second lens having negative refractive power are arranged therein in order from an object.

5. The telescope optical system according to claim 1, characterized in that the first diffractive optical element is cemented to an eye-point-side surface of the second lens having negative refractive power in the first cemented lens of the objective lens system.

6. The telescope optical system according to claim 1, characterized in that in the objective optical system, the first diffractive optical element is arranged between the first lens having positive refractive power and the second lens having negative refractive power of the first cemented lens; and the first diffractive optical element and the lenses of the objective optical system are all cemented.

7. The telescope optical system according to claim 1, characterized in that:
the objective lens system has a parallel flat plate on the object side of the first cemented lens; and
the first diffractive optical element is cemented to the parallel flat plate.

8. The telescope optical system according to claim 1, characterized in that:
the objective lens system has two parallel flat plates on the object side of the first cemented lens; and
the first diffractive optical element is arranged between the two parallel flat plates, and the first diffractive optical element and the parallel flat plates are all cemented.

9. The telescope optical system according to claim 1, characterized in that the second cemented lens of the eyepiece lens system has positive refractive power.

10. The telescope optical system according to claim 1, characterized in that the second cemented lens of the eyepiece lens system has the third lens having negative refractive power and the fourth lens having positive refractive power arranged therein in order from an object.

11. The telescope optical system according to claim 1, characterized in that the second diffractive optical element is arranged between the third lens having negative refractive power and the fourth lens having positive refractive power of the second cemented lens of the eyepiece lens system; and the second diffractive optical element and the lenses of the eyepiece lens system are all cemented.

12. The telescope optical system according to claim 1, characterized in that the second diffractive optical element is cemented to an object-side surface of the third lens having negative refractive power of the second cemented lens of the eyepiece lens system.

13. The telescope optical system according to claim 1, characterized in that the eyepiece lens system has at least one single lens having positive refractive power.

14. The telescope optical system according to claim 13, characterized in that the single lens having positive refractive power is arranged further towards the eye-point side than the second cemented lens of the eyepiece lens system.

15. The telescope optical system according to claim 13, characterized in that the second diffractive optical element is cemented to an eye-point-side surface of the single lens having positive refractive power of the eyepiece lens system.

16. The telescope optical system according to claim 1, characterized in that the eyepiece lens system has, further towards the object side than the position of an image created by the objective lens system, a lens having negative refractive power.

17. The telescope optical system according to claim 1, characterized in that the first diffractive optical surface and the second diffractive optical surface of each diffractive optical element are arranged so as to be in contact with each other.

18. The telescope optical system according to claim 1, characterized in that with regards to the first diffractive optical composing element and the second diffractive optical composing element forming each diffractive optical element, at least one of the composing elements comprises a UV-curing resin.

19. The telescope optical system according to claim 1, characterized in that the first diffractive optical composing element and the second diffractive optical composing element forming each diffractive optical element comprise UV-curing resins having optical characteristics that are different from each other.

20. The telescope optical system according to claim 1, characterized in that conditions represented by the following expressions are satisfied:

$$nd1 \leq 1.54$$

$$(nF1-nC1) \geq 0.0145$$

$$nd2 \geq 1.55$$

$$(nF2-nC2) \leq 0.0130$$

where:
among the two diffractive device composing elements forming each diffractive optical element, nd1, nF1, and nC1 represent the refractive index, in relation to the d-line, F-line, and C-line respectively, of a diffractive device composing element having a lower refractive index and a higher dispersion performance; and
nd2, nF2, and nC2 represent the refractive index, in relation to the d-line, F-line, and C-line respectively, of a diffractive device composing element having a higher refractive index and a lower dispersion performance.

21. An optical device comprising the telescope optical system according to claim 1.

* * * * *